(12) United States Patent
Jung et al.

(10) Patent No.: US 10,322,941 B2
(45) Date of Patent: Jun. 18, 2019

(54) PREPARATION METHOD OF CALCIUM CARBONATE WITH HIGH PURITY FROM INORGANIC MATERIALS CONTAINING ALKALI METALS OR ALKALI EARTH METALS

(71) Applicant: KOREA INSTITUTE OF SCIENCE AND TECHNOLOGY, Seoul (KR)

(72) Inventors: Kwang Deog Jung, Seoul (KR); Heung Yong Ha, Seoul (KR); Jun Woo Oh, Seoul (KR); Ho Yong Jo, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 269 days.

(21) Appl. No.: 15/435,801

(22) Filed: Feb. 17, 2017

(65) Prior Publication Data

US 2017/0240432 A1 Aug. 24, 2017

(30) Foreign Application Priority Data

Feb. 19, 2016 (KR) ......................... 10-2016-0019433

(51) Int. Cl.
  *C01F 11/18* (2006.01)
  *C21B 15/00* (2006.01)
  (Continued)

(52) U.S. Cl.
  CPC ............ *C01F 11/181* (2013.01); *C21B 15/00* (2013.01); *C22B 7/007* (2013.01); *C22B 7/04* (2013.01);
  (Continued)

(58) Field of Classification Search
  CPC ......... C01F 11/18; C01F 11/00; C01F 11/181; C01F 11/185; C01F 11/182; C01F 11/183; C01F 5/24; C22B 7/007
  See application file for complete search history.

(56) References Cited

U.S. PATENT DOCUMENTS 4,888,099 A * 12/1989 Welander ................. C01D 3/14
                                                        205/503
5,961,941 A * 10/1999 Klyosov ................. C01F 11/00
                                                        423/155
(Continued)

FOREIGN PATENT DOCUMENTS

KR       10-0998916 B1     12/2010
KR     10-2012-0059254 A    6/2012
(Continued)

OTHER PUBLICATIONS

Huijgen, W., et al., "Carbon dioxide sequestration by mineral carbonation," Literature Review Update 2003-2004, No. ECN-C-05-022, Energy research Centre of the Netherlands ECN (37 pages).
(Continued)

*Primary Examiner* — Melissa S Swain
(74) *Attorney, Agent, or Firm* — NSIP Law

(57) ABSTRACT

The present invention relates to a method and a process of preparing precipitated calcium carbonate of high purity by extracting calcium ion contained in an alkali ion-containing inorganic material such as mineral, steelmaking slag and waste concrete with the use of an acidic aqueous solution, separating other metal ions from the extracted solution, preparing an alkaline earth metal hydroxide using an alkaline aqueous solution and then contacting the same with carbon dioxide.

24 Claims, 24 Drawing Sheets

(51) Int. Cl.
  *C22B 7/00* (2006.01)
  *C22B 7/04* (2006.01)
(52) U.S. Cl.
  CPC ...... *C01P 2002/72* (2013.01); *C01P 2004/03* (2013.01); *C01P 2004/51* (2013.01); *C01P 2004/62* (2013.01); *C01P 2004/64* (2013.01); *C01P 2006/80* (2013.01); *Y02P 10/234* (2015.11)

(56) References Cited

U.S. PATENT DOCUMENTS 7,300,539 B2 * 11/2007 Phipps ................... C01F 11/18
  110/346
7,790,012 B2    9/2010 Kirk et al.

FOREIGN PATENT DOCUMENTS

| KR | 10-1157909 B1 | 6/2012 |
| KR | 10-2015-0080687 A | 7/2015 |
| KR | 10-1549980 B1 | 9/2015 |

OTHER PUBLICATIONS

Seifritz, W., "Co2 disposal by means of silicates," Nature, vol. 345, 1990 (p. 486).

Teir, S., et al, "Production of magnesium carbonates from serpentinite for long-term storage of $CO_2$," International Journal of Mineral Processing, vol. 85.1, 2007 (pp. 1-15).

Zevenhoven, R., et al., "Chemical fixation of $CO_2$ in carbonates: routes to valuable products and long-term storage," Catalysis Today, vol. 115.1, 2006 (pp. 73-79).

* cited by examiner

PREPARATION METHOD OF CALCIUM CARBONATE WITH HIGH PURITY FROM INORGANIC MATERIALS CONTAINING ALKALI METALS OR ALKALI EARTH METALS

CROSS-REFERENCE TO RELATED APPLICATIONS

This application claims, under 35 U.S.C. § 119, the priority of Korean Patent Application No. 10-2016-0019433, filed on Feb. 19, 2016, in the Korean Intellectual Property Office, the disclosure of which is incorporated herein by reference in its entirety.

BACKGROUND (a) Technical Field

The present invention relates to a method and a process of preparing precipitated calcium carbonate of high purity by extracting calcium ion contained in an alkali ion-containing inorganic material such as mineral, steelmaking slag and waste concrete with the use of an acidic aqueous solution, separating other metal ions from the extracted solution, preparing an alkaline earth metal hydroxide using an alkaline aqueous solution and then contacting the same with carbon dioxide.

(b) Background Art

The technology of preparing calcium carbonate from alkali ion-containing inorganic materials using carbon dioxide through an inorganic carbonation reaction has been consistently studied since its importance was reported by Seifritz (*Nature*, 345, 486 (1990)).

In the early years, a method of fixing carbon dioxide by injecting carbon dioxide directly into mineral was devised as in W. J. J. Huijgen and R. N. J. Comans, ERC report, ECN-C-05-022 (2005). However, the reaction rate was too slow and the cost of pretreatment was too high.

Later, a method of extracting calcium using acetic acid and then carbonating the same was developed by R. Zevenhoven, S. Eloneva, and S. Teir (*Catal. Today*, 115. 73 (2006)). However, the method lacked economical efficiency because the recovery of acetic acid was difficult.

Also, a method of using an acid and an alkali to extract alkali ions from mineral was devised by S. Teir, R. Kuusik, C.-J. Fogelhom and R. Zevenhove (*Int. J. of Miner. Proc.*, 85, 1 (2007)). However, there was a problem that the acid used as an extractant and the alkali used as a precipitator are expensive so that the preparation cost was too high.

Korean Patent Registration No. 10-1157909 developed a method of preparing a carbonate from steelmaking slag. This method separates slag from reactants by providing boron oxide to a reaction solution and then prepares calcium carbonate by injecting carbon dioxide. However, this method is problematic in that the yield and quality of calcium carbonate are low.

Korean Patent Publication No. 10-2012-0059254 developed a method of extracting calcium ions from natural mineral or steelmaking slag using an acid such as acetic acid, etc. and preparing calcium carbonate at a relatively low pH. However, this method is problematic in that the production cost of calcium carbonate is high with regard to recovery of the acid.

Various researches have been made to solve these problems and reduce the production cost of calcium carbonate. U.S. Pat. No. 7,790,012 B2 developed a method of preparing sodium hydroxide by oxidizing hydrogen produced from a chloralkali process at a low voltage and then preparing calcium carbonate for a cement by desalinating calcium ions contained in brine or seawater using the same.

And, Korean Patent Publication No. 10-2015-0080687, developed by the inventors of the present invention, provided a method of preparing sodium hydroxide and hydrochloric acid through electrolysis of sodium chloride, extracting calcium ions from an inorganic material using the hydrochloric acid and then preparing sodium bicarbonate or sodium carbonate by providing carbon dioxide to the sodium hydroxide, thereby preparing calcium carbonate from calcium ions.

The production cost of calcium carbonate could be reduced by the above methods. However, the calcium carbonate prepared through the methods has low purity because impurities such as aluminum, magnesium, iron, etc. are included. In addition, the calcium carbonate has been used at low costs only for making cement due to its large particles. Although the calcium carbonate is prepared from high priced acids and alkali it is used only as a low-priced raw material for cement so that the calcium carbonate is proved uneconomical.

REFERENCES OF THE RELATED ART

Patent Documents (Patent document 1) 1. Korean Patent Registration No. 10-1157909.
(Patent document 2) 2. Korean Patent Publication No. 10-2012-0059254.
(Patent document 3) 3. U.S. Pat. No. 7,790,0112 B2.
(Patent document 4) 4. Korean Patent Publication No. 10-2015-0080687.

Non-Patent Documents (Non-patent document 1) 1. W. J. J. Huijgen and R. N. J. Comans, ERC report, ECN-C-05-022 (2005).
(Non-patent document 2) 2. R. Zevenhoven, S. Eloneva, and S. Teir, *Catal. Today*, 115. 73 (2006).
(Non-patent document 3) 3. S. Teir, R. Kuusik, C.-J. Fogelhom and R. Zevenhove, *Int. J. of Miner. Proc.*, 85, 1 (2007).

SUMMARY

In order to solve the problem that calcium carbonate prepared from a waste inorganic material by electrolysis has low purity and lacks economic efficiency, the inventors of the present invention developed a method for preparing calcium carbonate of high purity using an acid and an alkali.

In the present invention, a waste acid and a waste alkali may be used and an acid and an alkali produced from an efficient process of preparing an acid and an alkali by electrolysis may also be used.

The present invention is directed to providing a method for preparing high-purity calcium carbonate from an alkali metal-containing inorganic material such as waste concrete, slag, etc. by completely removing an impurity such as aluminum, iron, magnesium, etc. The present invention is also directed to providing a preparation method of calcium carbonate whose particles are various in size according to use purposes by overcoming the problem of the conventional method where in the process of preparing calcium carbonate from high-quality limestone, the particle size and purity level of calcium carbonate cannot be adjusted to use purposes.

The present invention is also directed to providing a method of reducing a production cost involved in a preparing process of an acid to the minimum which is used to extract calcium ions from an alkali ion-containing inorganic material, by establishing a condition that the molar ratio of the calcium ions which are extracted from the inorganic material per mol of the acid is kept high. The present invention is also directed to solving the problem that the calcium carbonate prepared from an inorganic material with the use of an acid and an alkali which are produced by the conventional electrochemical method has a low quality due to its micrometer-sized particles so that it is less economical than the calcium carbonate prepared from limestone.

The present invention is also directed to providing a preparation method using an electrolysis system which allows preparation of hydrochloric acid and sodium hydroxide necessary for dissolution and precipitation of alkali ion contained in an inorganic material simultaneously in large quantities.

The purposes of the present invention are not limited to those described above. The purposes of the present invention will become more apparent by the following description and may be embodied by the means described in the claims and their combinations.

A method for preparing high-purity calcium carbonate from an alkali ion-containing inorganic material according to the present invention may include (1) a step of preparing hydrochloric acid and a sodium hydroxide aqueous solution or a mixture of the sodium hydroxide aqueous solution and the potassium hydroxide aqueous solution, (2) a step of producing a dissolving solution by extracting metal ions including calcium ion from an alkali ion-containing inorganic material using the hydrochloric acid, (3) a step of removing an impurity from the dissolving solution by reacting the dissolving solution with the mixture of the aqueous sodium hydroxide solution and the aqueous potassium hydroxide solution, (4) a step of producing a slurry containing calcium hydroxide by reacting the impurity-removed dissolving solution with the mixture of the aqueous sodium hydroxide solution and the aqueous potassium hydroxide solution and (5) a step of preparing the calcium hydroxide into high-purity calcium carbonate by providing carbon dioxide to the slurry.

In a specific exemplary embodiment of the present invention, in the step (1), the hydrochloric acid and the sodium hydroxide aqueous solution or the mixture of the aqueous sodium hydroxide solution and the aqueous potassium hydroxide solution may be prepared by purifying a waste acid and a waste alkali.

In a specific exemplary embodiment of the present invention, in the step (1), the hydrochloric acid and the sodium hydroxide aqueous solution or the mixture of the aqueous sodium hydroxide solution and the aqueous potassium hydroxide solution may be prepared by providing a sodium chloride aqueous solution or a mixture of the aqueous sodium chloride solution and the aqueous potassium chloride solution to an electrolysis system.

In a specific exemplary embodiment of the present invention, the method may further include, following the step (5), a step (6) of recycling the mixture of the aqueous sodium chloride solution and the aqueous potassium chloride solution remaining after separating the calcium carbonate to the step (1).

In a specific exemplary embodiment of the present invention, the inorganic material may be one or more selected from a group consisting of waste concrete, slag, fly ash, feldspar ($CaAl_2Si_2O_8$), forsterite ($Mg_2SiO_4$), glauconite, ilmenite ($FeTiO_3$), listwanite (carbonated serpentinite), magnetite, olivine (($Mg,Fe)_2SiO_4$), opoka, serpentine, serpentinite, talc ($Mg_3Si_4Si_{10}(OH)_2$) and wollastonite ($CaSiO_3$).

In a specific exemplary embodiment of the present invention, the step (2) may be performed under the condition of a hydrochloric acid concentration of 0.1-5.0 M, a solid-to-liquid ratio 10-500 g/L and a reaction temperature of 10-200° C.

In a specific exemplary embodiment of the present invention, in the step (2), a hydrochloric acid consumption yield based on the alkali ion may be 70-100%.

In a specific exemplary embodiment of the present invention the concentration of the sodium hydroxide aqueous solution or the mixture of the sodium hydroxide aqueous solution and the potassium hydroxide aqueous solution added in the step (3) may be 0.1-5.0 mol/L.

In a specific exemplary embodiment of the present invention, in the step (3), the impurity may be removed by addition of the sodium hydroxide aqueous solution or the mixture of the sodium hydroxide aqueous solution and the potassium hydroxide aqueous solution and accordingly the pH of the dissolving solution is 7 to 13.

In a specific exemplary embodiment of the present invention, the impurity may be mainly a chloride or an oxide of magnesium, iron or aluminum metal and may additionally include various metals and inorganic materials such as manganese, titanium, sulfur, etc.

In a specific exemplary embodiment of the present invention, in the step (3), the impurity may be precipitated by reacting with the sodium hydroxide aqueous solution or the mixture of the aqueous sodium hydroxide solution and the aqueous potassium hydroxide solution and the precipitated impurity may be removed by centrifugation or filtration.

In a specific exemplary embodiment of the present invention, the concentration of the sodium hydroxide aqueous solution or the mixture of the aqueous sodium hydroxide solution and the potassium hydroxide aqueous solution added in the step (4) may be 0.1-5.0 mol/L.

In a specific exemplary embodiment of the present invention, in the step (4), a volume ratio of the impurity-removed dissolving solution and the sodium hydroxide aqueous solution or the mixture of the sodium hydroxide aqueous solution and the potassium hydroxide aqueous solution may be 2:1 to 1:5.

In a specific exemplary embodiment of the present invention, in the step (5), calcium carbonate may be prepared by supply of carbon dioxide. The flow rate of the carbon dioxide does not significantly affect the physical properties of calcium carbonate.

In a specific exemplary embodiment of the present invention, the step (5) may be performed under the condition of a reaction temperature of 5-150° C. and a pressure of 1-20 atm.

In a specific exemplary embodiment of the present invention, the high-purity calcium carbonate may have a purity of 93.0% or higher, specifically 95.0% or higher, more specifically 98.0-99.9%, a whiteness index of 94.0-99.9 and an average particle size of 5-5,000 nm. The purity and the particle size of the calcium carbonate may be adjusted by changing the reaction conditions in the steps (2) and (3).

In a specific exemplary embodiment of the present invention, hydrochloric acid may be used as an acid and sodium hydroxide/potassium hydroxide may be used as an alkali, but not limited thereto.

In a specific exemplary embodiment of the present invention, a waste acid may be used as an acid and a waste alkali may be used as an alkali. When metal is contained at a low concentration, the impurity remaining in the step (1) may be purified in the step (2) and the waste alkali at a low concentration may be filtered and used in the steps (2) and (3).

In another specific exemplary embodiment of the present invention, the waste acid and the waste alkali may be purified by electrodialysis.

In a specific exemplary embodiment of the present invention, high-purity calcium carbonate can be prepared using a system which simultaneously produces inexpensive acid and alkali by electrolysis as shown in FIG. 2.

In a specific exemplary embodiment of the present invention, in the step (1), hydrochloric acid and sodium hydroxide may be prepared by an electrolysis system composed of an anodic catalytic membrane cell (C), a feed solution cell and a cathodic catalytic membrane cell (D), as shown in FIG. 3. A cation exchange membrane may be placed between the anodic catalytic membrane cell and the feed solution cell so that sodium and potassium ions can selectively pass therethrough and an anion exchange membrane may be placed between the cathodic catalytic membrane cell and the feed solution cell so that chloride ion can selectively pass therethrough. Specifically, the step (1) may include (1-1) a step of providing a sodium chloride aqueous solution or a mixture of the sodium chloride aqueous solution and the potassium chloride aqueous solution to the feed solution cell, (1-2) a step of providing oxygen to the anode, (1-3) a step wherein hydroxide ion is produced at the anode with the oxygen reduced and the hydroxide ion reacts with sodium ion or sodium ion/potassium ion that selectively penetrated into the anode from the feed solution cell and therefore the sodium hydroxide aqueous solution or the mixture of the sodium hydroxide aqueous solution and the potassium hydroxide aqueous solution is produced, (1-4) a step of separating the sodium hydroxide aqueous solution or the mixture of the sodium hydroxide aqueous solution and the potassium hydroxide aqueous solution from unreacted oxygen, storing the aqueous solution for use in the steps (3) and (4), and providing the unreacted oxygen again to the anode, (1-5) a step of providing hydrogen to the cathode, (1-6) a step wherein hydrogen cation is produced at the cathode with the hydrogen oxidized and the hydrogen cation reacts with a chloride ion that selectively penetrated from the feed solution cell into the cathode and therefore a hydrochloric acid is produced, and (1-7) a step of separating the hydrochloric acid from the unreacted hydrogen, storing the hydrochloric acid for use in the step (2) and providing the unreacted hydrogen again to the cathode.

In a specific exemplary embodiment of the present invention, the electrolysis system may be operated under the condition of a temperature of 10-250° C. and a pressure of 1-50 atm.

In a specific exemplary embodiment of the present invention, in the step (1), hydrochloric acid and sodium hydroxide may be prepared by an electrolysis system composed of an anodic catalytic membrane cell (C), a feed solution cell and a cathodic catalytic membrane cell (D), as shown in FIG. 4. Specifically, the step (1) may include (1-1) a step of providing a sodium chloride aqueous solution or a mixture of the sodium chloride aqueous solution and the potassium chloride aqueous solution to the feed solution cell, (1-2) a step wherein hydrogen and hydroxide ion are produced at the anode with water electrolyzed, the hydroxide ion reacts with sodium ion or sodium ion/potassium ion that selectively penetrated into the anode from the feed solution cell and therefore a sodium hydroxide aqueous solution or a mixture of the sodium hydroxide aqueous solution and the potassium hydroxide aqueous solution is produced, (1-3) a step of separating the hydrogen and the sodium hydroxide aqueous solution or the mixture of the sodium hydroxide aqueous solution and the potassium hydroxide aqueous solution produced at the anode, storing the aqueous solution for use in the steps (3) and (4), and providing the hydrogen to the cathode, (1-4) a step wherein the hydrogen becomes hydrogen cation at the cathode and the hydrogen cation reacts with a chloride ion that selectively penetrated from the feed solution cell into the cathode and therefore the hydrochloric acid is produced, and (1-5) a step of separating the hydrochloric acid produced at the cathode and unreacted hydrogen into gas and liquid, storing the hydrochloric acid for use in the step (2) and providing the unreacted hydrogen again to the cathode together with the hydrogen of the step (1-3).

In a specific exemplary embodiment of the present invention, the electrolysis system may be operated under the condition of a temperature of 10-200° C. and a pressure of 1-50 atm.

In a specific exemplary embodiment of the present invention, in the step (6), cation remaining in the mixture of the sodium chloride aqueous solution and the potassium chloride aqueous solution may be removed with the use of a flocculant and then the aqueous solution may be recycled to the step (1).

In a specific exemplary embodiment of the present invention, the flocculant may be an anionic polymer flocculant.

In a specific exemplary embodiment of the present invention, in the step (6), a sodium chloride aqueous solution is additionally provided to the mixture of the sodium chloride aqueous solution and the potassium chloride aqueous solution when the mixture of the sodium chloride aqueous solution and the potassium chloride aqueous solution is recycled to the step (1).

In a specific exemplary embodiment of the present invention, the added sodium chloride aqueous solution is provided to the mixture of the sodium chloride aqueous solution and the potassium chloride aqueous solution after its impurity is removed through the step (3) and the step (4).

The preparation method of the present invention provides an effect of preparing high-purity calcium carbonate from waste concrete or slag by completely removing impurity such as aluminum, iron, magnesium, etc.

Also, the preparation method of the present invention provides an effect of minimizing the production cost involved in the preparation of an acid because the molar ratio of calcium ions extracted from an alkali ion-containing inorganic material per mol of an acid can be maintained high.

Also, the preparation method of the present invention provides an effect of preparing calcium carbonate of high purity various in a particle size ranging from nanometers to micrometers by solving the problem that the calcium carbonate prepared from an inorganic material fail to ensure economical efficiency due to a low quality as compared with the calcium carbonated prepared from limestone Also, the preparation method of the present invention provides an effect of improving economical efficiency to maximum because waste acid and waste alkali can be used to extract alkali ion and prepare calcium carbonate with the effect on the environment minimized. Also the preparation method of the present invention has an advantage of using available waste resources in various ways because hydrochloric acid and sodium hydroxide or potassium hydroxide can be prepared from excess hydrogen or byproduct hydrogen with little power consumption. Also, the preparation method of the present invention further provides an effect of reducing production cost because hydrochloric acid and sodium hydroxide necessary for dissolution and precipitation of alkali ions contained in an inorganic material can be prepared simultaneously in large quantities using an electrolysis system with very low power consumption.

The effects of the present invention are not limited to those described above. It is desirable that the present invention involves all effects produced from the following description.

BRIEF DESCRIPTION OF DRAWINGS

FIG. 9($b$) shows the change in the metal ion concentration and pH in a dissolving solution prepared from steelmaking slag (solid-to-liquid ratio=50 g/L) when a sodium hydroxide aqueous solution is added to the dissolving solution. Specifically, X-axis represents pH and Y-axis represents the change in the metal ion concentration.

FIG. 10($b$) shows the change in the metal ion concentration and pH in a dissolving solution prepared from waste concrete (solid-to-liquid ratio=50 g/L) when a sodium hydroxide aqueous solution is added to the dissolving solution. Specifically, X-axis represents pH and Y-axis represents the change in the metal ion concentration.

FIG. 12($b$) shows the scanning electron microscopic images of calcium carbonate samples 2 prepared in Example 4.

FIG. 12($c$) shows the scanning electron microscopic images of calcium carbonate samples 3 prepared in Example 4.

FIG. 12($d$) shows the scanning electron microscopic images of calcium carbonate samples 4 prepared in Example 4.

FIG. 13($b$) shows the scanning electron microscopic images of calcium carbonate prepared by injecting carbon dioxide at a flow rate of 1,000 mL/min in Example 6. The large images are at 30000× magnification and the small images are at 100000× magnification.

FIG. 13($c$) shows the scanning electron microscopic images of calcium carbonate prepared by injecting carbon dioxide at a flow rate of 1,500 mL/min in Example 6. The large images are at 30000× magnification and the small images are at 100000× magnification.

FIG. 14($b$) shows a particle size analysis result of calcium carbonate prepared by injecting carbon dioxide at a flow rate of 1,000 mL/min in Example 6.

FIG. 14($c$) shows a particle size analysis result of calcium carbonate prepared by injecting carbon dioxide at a flow rate of 1,500 mL/min in Example 6.

DETAILED DESCRIPTION

Hereinafter, the present invention is described in detail through exemplary embodiments. The exemplary embodiments of the present invention can be changed variously as long as the subject matter of the present invention is not changed. However, the scope of the present invention is not limited by the exemplary embodiments.

Description of well-known elements and functions will be omitted to avoid obscuring the subject matter of the present invention. In the present specification, "include" means that additional constitutional elements can be further included unless specified otherwise.

Figure 1:
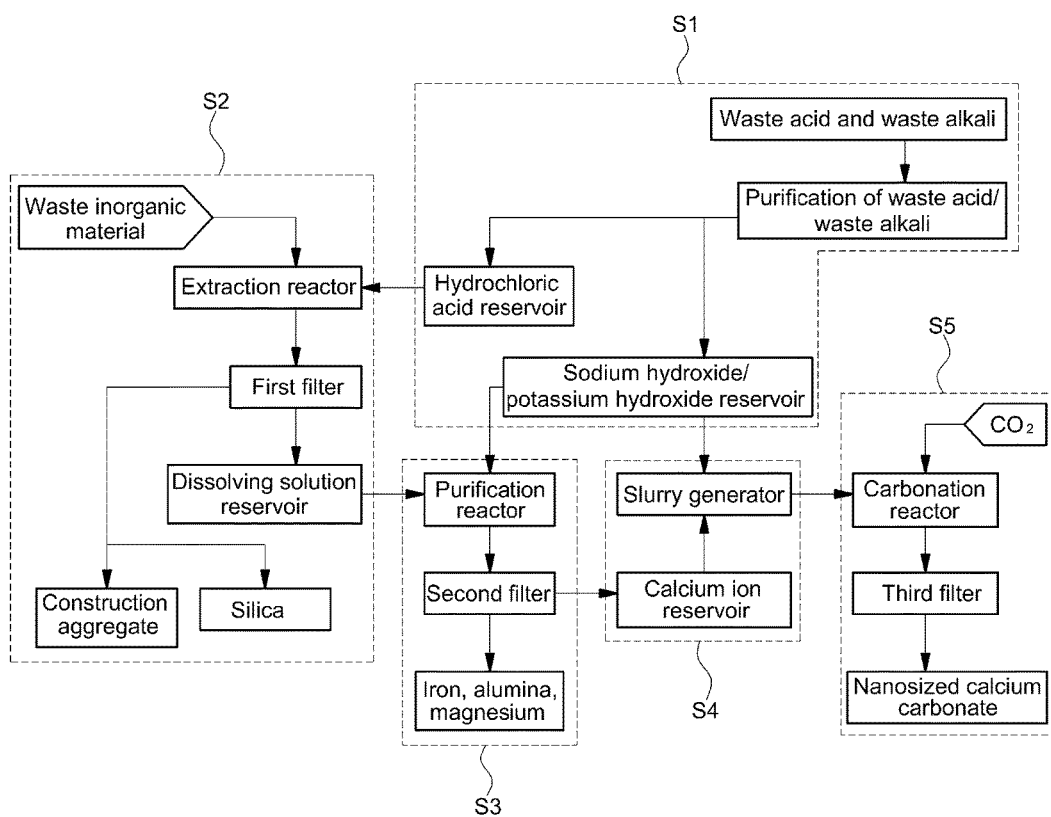
FIG. 1 shows a process of preparing high-purity calcium carbonate using an acid and an alkali or a waste acid and a waste alkali according to an exemplary embodiment of the present invention.
Figure 2:
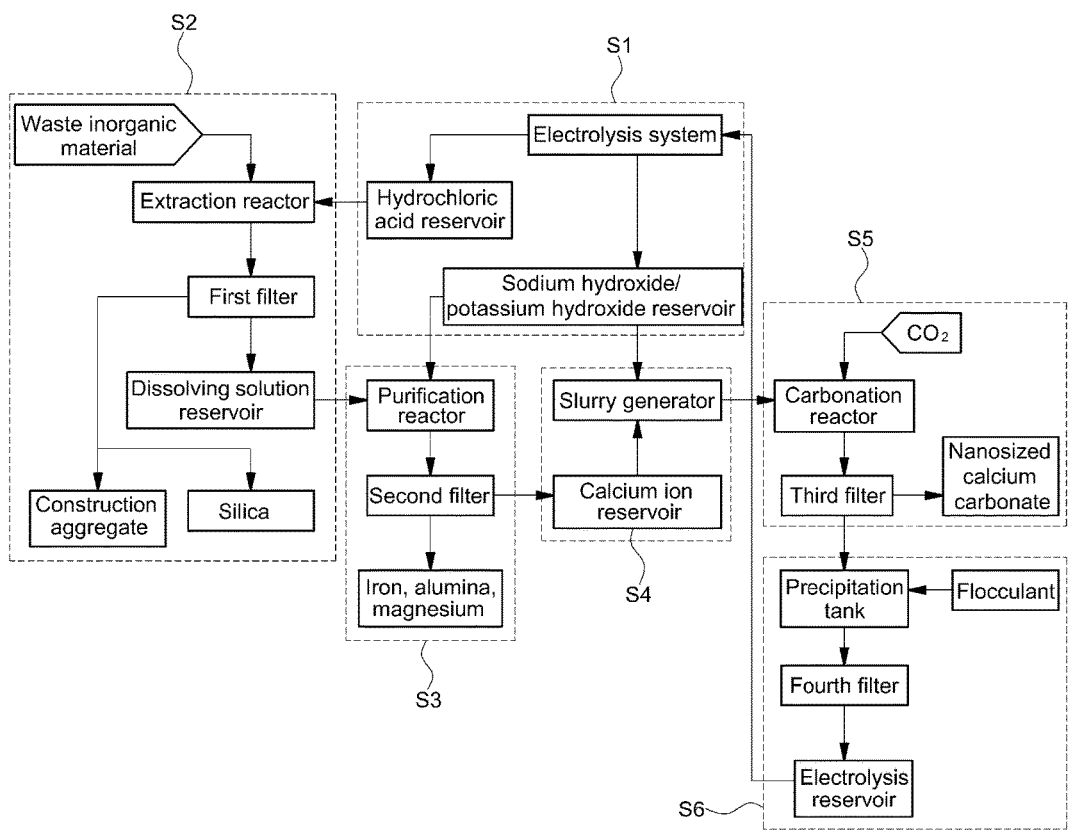
FIG. 2 shows a process of preparing high-purity calcium carbonate by preparing an acid and an alkali simultaneously by electrolysis according to another exemplary embodiment of the present invention.

The present invention relates to a method for preparing high-purity calcium carbonate from an alkali ion-containing waste inorganic material such as waste concrete, slag, etc. using cheaply prepared acid and alkali FIG. 1 and FIG. 2 briefly show a process of the method for preparing high-purity calcium carbonate from an alkali ion-containing inorganic material of the present invention.

However, FIG. 1 and FIG. 2 only show an exemplary embodiment of the present invention and thus the present invention is not limited thereto.

In the present invention, 'alkali ion' collectively refers to an alkali metal ion or an alkaline earth metal ion. In the present invention, the alkali ion refers to an alkali metal ion or an alkaline earth metal ion unless specified otherwise.

Referring to FIG. 1 and FIG. 2, the method for preparing high-purity calcium carbonate from an alkali ion-containing inorganic material of the present invention may include (S1) a step of preparing hydrochloric acid and a sodium hydroxide aqueous solution or a mixture of the sodium hydroxide aqueous solution and the potassium hydroxide aqueous solution, (S2) a step of producing a dissolving solution by extracting metal ions including a calcium ion from an alkali ion-containing inorganic material using the hydrochloric acid, (S3) a step of removing an impurity from the dissolving solution by reacting the dissolving solution with the mixture of the sodium hydroxide aqueous solution and the potassium hydroxide aqueous solution, (S4) a step of producing a slurry-containing calcium hydroxide by reacting the impurity-removed dissolving solution with the mixture of the sodium hydroxide aqueous solution and the potassium hydroxide aqueous solution and (S5) a step of transforming the calcium hydroxide into high-purity calcium carbonate by providing carbon dioxide to the slurry.

The respective steps of the method for preparing high-purity calcium carbonate from an alkali ion-containing inorganic material of the present invention are described in detail as follows.

In an exemplary embodiment of the present invention, the step (S1) may be a step wherein hydrochloric acid and a sodium hydroxide aqueous solution or a mixture of the sodium hydroxide aqueous solution and the potassium hydroxide aqueous solution are prepared through the purification of a waste acid and a waste alkali as shown in FIG. 1, and instead of the waste acid or the waste alkali industrial acid and alkali may be used. By purifying a waste acid and a waste alkali as shown in FIG. 1. However, industrial acid and alkali may also be used instead of the waste acid or the waste alkali.

In another exemplary embodiment of the present invention, the step (S1) may be a step wherein hydrochloric acid and a sodium hydroxide aqueous solution or a mixture of the sodium hydroxide aqueous solution and the potassium hydroxide aqueous solution are prepared by electrolysis of sodium chloride or potassium chloride as shown in FIG. 2. Detailed description will be followed hereinafter.

The step (S2) is a step wherein calcium ion ($Ca^{2+}$) contained in the waste inorganic material is dissolved as calcium chloride ($CaCl_2$) by reacting the hydrochloric acid prepared by the electrolysis system with the waste inorganic material in an extraction reactor.

The waste inorganic material may be one or more selected from a group consisting of waste concrete, slag, fly ash, feldspar ($CaAl_2Si_2O_8$), forsterite ($Mg_2SiO_4$), glauconite, ilmenite ($FeTiO_3$), listwanite (carbonated serpentinite), magnetite, olivine (($Mg,Fe)_2SiO_4$), opoka, serpentine, serpentinite, talc ($Mg_3Si_4Si_{10}(OH)_2$) and wollastonite ($CaSiO_3$). Advisably, waste concrete or slag may be used considering economical efficiency and calcium ion content.

The waste inorganic material further contains silicon (Si), titanium (Ti), manganese (Mn), magnesium (Mg), iron (Fe), aluminum (Al) and potassium (K) ions, as well as a calcium ion which is a major component.

A hydrochloric acid is used to extract an alkali ion from the waste inorganic material. Calcium, magnesium, iron, aluminum and potassium which are highly soluble in the hydrochloric acid are extracted with the use of a dissolving solution, whereas silicon, titanium and manganese which are poorly soluble in the hydrochloric acid remain as oxides.

Therefore, after the oxides of silicon, titanium and manganese are removed through a first filter the dissolving solution is reserved in a dissolving solution reservoir for the next step The first filter may be a filter device such as a filter press, a centrifuge, a vacuum filter, etc.

The oxides of silicon, titanium and manganese may be obtained from a product which is ready to be used as an aggregate. The dissolving solution contains the calcium, magnesium, iron, aluminum and potassium ions in the form of calcium chloride ($CaCl_2$), magnesium chloride ($MgCl_2$), iron chloride ($FeCl_2$, $FeCl_3$), aluminum chloride ($AlCl_3$) and potassium chloride (KCl), respectively.

In the present invention, the operating condition of the extraction reactor is established such that the consumption yield of hydrochloric acid can be maximized. In the present invention, the consumption yield of hydrochloric acid refers to the molar ratio of the extracted calcium ion per mol of the hydrochloric acid used. (The present invention establishes an operating condition of the extraction reactor that the consumption yield of hydrochloric acids is maximized. In the present invention, the consumption yield of hydrochloric acids refers to the molar ratio of the calcium ions extracted per mol of the hydrochloric acids in the extraction reactor.) The hydrochloric acid consumption yield may be expressed by Equation 1.

Hydrochloric acid consumption yield [%]= Ca/(2HCl)*100       [Equation 1]

In Equation 1, Ca means the mol of calcium ion extracted from the waste inorganic material and HCl means the mol of hydrochloric acid used in the extraction reactor.

A hydrochloric acid consumption yield of 100% means that the hydrochloric acids prepared by the electrolysis system were used up to extract calcium ion from the waste inorganic material. In other words, the hydrochloric acids were never used to extract magnesium, iron, aluminum and potassium of the waste inorganic material. The higher the hydrochloric acid consumption yield, the less is the amount of hydrochloric acids that are to be prepared by the electrolysis system. Accordingly, the cost of preparing high-purity calcium carbonate can be reduced.

The inventors of the present invention simulated the extraction reaction to establish the operating condition of the extraction reactor that can maximize the hydrochloric acid consumption yield.

Common extraction variables are solid-to-liquid ratio, reaction temperature, solution pH, etc. and an appropriate extraction rate equation can be obtained from the shrinking core model (Levenspiel, 1999, Chemical Reaction Engineering, 3rd edition, Wiley, New York).

However, the rate equation of the shrinking core model is not suitable when the alkali ion of waste concrete or slag is extracted by a hydrochloric acid as in the present invention. The inventors of the present invention found out that an extraction rate equation derived from the Avrami model, which is used for crystallization kinetics (Avrami, M (1939), "Kinetics of Phase Change. I. General Theory", *Journal of Chemical Physics* 7 (12): 1103-1112), can be more available The dissolution rate of a calcium ion from waste concrete or slag can be expressed by Equation 2.

$$X_{Oz} = \frac{m_{amount\ of\ dissolved\ Oz=sample}}{m_{amount\ of\ Oz=waste\ concrete}} \quad \text{[Equation 2]}$$

In Equation 2, the denominator refers to the mol of the calcium ion the dissolving solution contains and the numerator refers to the mol of calcium ion the waste concrete or slag contains.

The extraction rate equation of the Avrami model is as follows.

$$kt^n = -\ln(1-x) \quad \text{[Equation 3]}$$

Equation 4 is obtained when Equation 3 applies to the operating condition of the extraction reactor.

$$-\ln(1-X_M) = k_0(C)^l(S/L)^m \exp(-Ed/RT)t^n \quad \text{[Equation 4]}$$

In Equation 4, $X_M$ is the dissolution rate of Equation 2, C is the concentration of a hydrochloric acid, S/L is the solid-to-liquid ratio of a waste inorganic material and a hydrochloric acid, Ed is the activation energy of the dissolution reaction, T is the reaction temperature, t is the reaction time and l, m and n are the coefficients for the concentration of hydrochloric acid, the solid-to-liquid ratio and the reaction time respectively.

By using Equation 4, the optimized operating condition of the extraction reactor can be established from the concentration ratio of calcium ion and impurity ions (magnesium, iron and aluminum ions).

For example, when slag is used as the waste inorganic material, the dissolution rate equations of calcium ion and magnesium ion are as follows.

$$-\ln(1-x_{Cs}) = 0.692(c)^{-1.100}(S/L)^{-1.209} \exp(-1333.160/T)t^{0.177}$$

$$-\ln(1-x_{Ms}) = 0.335(C)^{1.022}(S/L)^{-1.069} \exp(-1042.710/T)t^{0.093} \quad \text{[Equation 5]}$$

The extraction variables that can maximize the extraction rate of calcium ion as compared with the extraction rate of magnesium ion can be found with Equation 5, and when the extraction reactor is operated according to the extraction variables the amounts of calcium ions are maximized while the extraction amounts of magnesium ions are minimized By applying this procedure to iron and aluminum ions too, the mol of calcium ions extracted from the waste inorganic material can be maximized. As a result, the hydrochloric acid consumption yield can be maximized and the preparation cost of calcium carbonate can be reduced.

The operating condition of the extraction reactor in the step (S2) is as follows.

The concentration of the hydrochloric acid provided to the extraction reactor may be 0.1-5.0 M. When the concentration exceeds 5.0 M, an excessive amount of magnesium, iron and aluminum ions as well as a calcium ion may be dissolved. And, when the concentration is less than 0.1 M, calcium ion can be inadequately extracted. Hence, the concentration of hydrochloric acid may be more desirably 0.45-0.55 M.

The reaction temperature of the extraction reactor may be 10-200° C. When the reaction temperature is higher than 200° C., the extraction rate increases but an additional apparatus is necessary to prevent the evaporation of hydrochloric acid. And, when the temperature is less than 10° C., an apparatus to decrease temperature is required. Advisably, the reaction temperature may be 30-80° C.

The solid-to-liquid ratio of the waste inorganic material and the hydrochloric acid of the extraction reactor is the most significant variable to increase the hydrochloric acid consumption yield. This will be described in more detail through the following examples. When the hydrochloric acid concentration and the reaction temperature are optimal, the solid-to-liquid ratio may be 40-70 g/L and accordingly the hydrochloric acid consumption yield can be maintained at 80% or higher.

For the slag, the hydrochloric acid consumption yield increases slowly when the solid-to-liquid ratio is 40 g/L or higher but stops increasing when it exceeds 70 g/L.

For the waste concrete, the hydrochloric acid consumption yield reaches 80% or higher when the solid-to-liquid ratio is 35 g/L or higher and the best hydrochloric acid consumption yield is achieved at the solid-to-liquid ratio between 50 and 70 g/L. However, if exceeding the ratio, the yield begins to decrease.

The step (S3) is a step wherein the dissolving solution provided from the dissolving solution reservoir is reacted with a sodium hydroxide aqueous solution or a mixture of the sodium hydroxide aqueous solution and the potassium hydroxide aqueous solution in a purification reactor to remove magnesium chloride, iron chloride and aluminum chloride from the dissolving solution.

As described above, the dissolving solution contains magnesium chloride, iron chloride, aluminum chloride and potassium chloride along with calcium chloride.

Potassium ion can be seen as an inert substance throughout the entire process because, it is not carbonated despite a carbonation process which will be described below. Accordingly, the potassium ion needs not be removed because it does not significantly affect the purity, whiteness index, etc. of the final product calcium carbonate.

If the step (S4) and the step (S5) are performed without removing the magnesium, iron and aluminum ions from the dissolving solution, not only the growth of calcium carbonate particles but also the purity and whiteness index of calcium carbonate are greatly affected.

In particular, an aluminum ion can cause the preparation of 98.5% or higher pure calcium carbonate to be difficult because of being precipitated simultaneously with calcium carbonate. And, the iron ion may prevent the preparation of calcium carbonate with a whiteness index of 97 or higher.

Accordingly, it is very important to remove the impurities, magnesium chloride, iron chloride and aluminum chloride, from the dissolving solution.

The impurity may be removed by adding the sodium hydroxide aqueous solution or the mixture of the sodium hydroxide aqueous solution and the potassium hydroxide aqueous solution prepared by the electrolysis system to the dissolving solution. The impurity reacts with sodium hydroxide and potassium hydroxide to be transformed into sediment in the form of a metal hydroxide. The impurity in the form of a metal hydroxide has a very low solubility constant value of $1.6 \times 10^{-12}$ for magnesium hydroxide, $7.9 \times 10^{-16}$ for iron hydroxide and $3 \times 10^{-34}$ for aluminum hydroxide as compared to $6.5 \times 10^{-6}$ of calcium hydroxide. Accordingly, only the magnesium hydroxide, iron hydroxide and aluminum hydroxide can be removed through precipitation by controlling the pH of the dissolving solution.

Then, the impurity may be removed from the dissolving solution by filtering the sediment through a second filter. The second filter may be identical to the first filter described above and a detailed description thereof will be omitted.

It is important to minimize the consumption of the sodium hydroxide aqueous solution or the mixture of the sodium hydroxide aqueous solution and the potassium hydroxide aqueous solution used for removing the impurity in consideration of the hydrochloric acid consumption yield as described above.

Because most of the impurity is precipitated when the pH of the dissolving solution is about 11 as will be described later, the consumption amount of the sodium hydroxide aqueous solution or the mixture of the sodium hydroxide aqueous solution and the potassium hydroxide aqueous solution n is not large.

In the step (S3), a calcium purification yield may be more important than the consumption amount. When the sodium hydroxide aqueous solution or the mixture of the sodium hydroxide aqueous solution and the potassium hydroxide aqueous solution is injected to the dissolving solution, calcium carbonate may also be removed together with the impurity as it is precipitated into calcium hydroxide.

The calcium purification yield refers to the ratio of calcium ion removed together with the impurity. It can be expressed by Equation 6.

Calcium purification yield=(calcium ion after purification−calcium ion before purification)/calcium ion before purification    [Equation 6]

The present invention establishes the operating condition that the calcium purification yield is maintained at a low level in the purification reactor.

The calcium purification yield is not determined independently in the step (S3) but is closely related with the concentration distribution of the alkali ions extracted in the step (S2). It was found out from experiments that the calcium purification yield is high when a calcium ion is extracted at high solid-to-liquid ratio of the waste inorganic material and the hydrochloric acid. In order to maintain the calcium purification yield high, the solid-to-liquid ratio of the extraction reactor in the step (S2) may be set to 35 g/L or higher, desirably 50-75 g/L.

The pH of the dissolving solution in the purification reactor may be 7-13. In order to prepare 98.5% or higher pure calcium carbonate, impurities are removed with a pH of at least 7 Specifically, the sodium hydroxide aqueous solution or the mixture of the sodium hydroxide aqueous solution and the potassium hydroxide aqueous solution may be provided such that the pH is 8.5 or higher for the waste concrete and pH 13 or higher for the slag.

The temperature of the purification reactor may be 10-80° C., specifically 20-50° C. at which temperature control is not required. Because potassium chloride is not removed in the step (S3), the dissolving solution passed through the second filter contains calcium chloride and potassium chloride. The impurity-removed dissolving solution is provided to a calcium ion reservoir.

The step (S4) is a step wherein a calcium hydroxide slurry is produced by reacting the dissolving solution provided from the calcium ion reservoir with the sodium hydroxide aqueous solution or the mixture of the sodium hydroxide aqueous solution and the potassium hydroxide aqueous solution prepared by the electrolysis system in a slurry generator.

With the pH of the dissolving solution increasing the calcium chloride of a high solubility constant value is precipitated into calcium hydroxide and the slurry is generated.

The reaction occurring in the slurry generator is as follows.

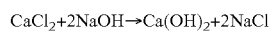

$CaCl_2 + 2NaOH \rightarrow Ca(OH)_2 + 2NaCl$

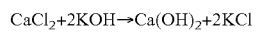

$CaCl_2 + 2KOH \rightarrow Ca(OH)_2 + 2KCl$

In order to prepare nano-sized calcium carbonate, it is necessary to first prepare the calcium hydroxide in the form of slurry. To perform it, the dissolving solution is reacted with the sodium hydroxide aqueous solution or the mixture of the sodium hydroxide aqueous solution and the potassium hydroxide aqueous solution at a volume ratio of 2:1 to 1:5.

The slurry contains calcium hydroxide, sodium chloride and potassium chloride an and is provided to a carbonation reactor.

The step (S5) is a step wherein high-purity calcium carbonate is prepared by carbonating the calcium hydroxide by injecting carbon dioxide to the slurry provided to the carbonation reactor.

In order to prepare uniformly dispersed calcium carbonate, it is necessary to prevent the pH of the slurry from a rapid decrease during the early stage of carbonation. Accordingly, it is considerably important to control the carbon dioxide flow rate in the step (S5). In addition, the size and distribution of calcium carbonate can be adjusted according to reaction temperature and reaction pressure.

The carbon dioxide may be provided desirably at a rate of 500-1500 mL/min. Also, the carbonation reactor may be operated under the condition of a reaction temperature of 5-150° C. and a pressure of 1-20 atm. However, because calcium carbonate can be obtained at room temperature and normal pressure, the carbonation reactor may be operated under the condition of room temperature and normal pressure in the aspect of economical efficiency.

When the pH of the reactant in the carbonation reactor decreases to 7 or lower and remains constant, the carbon dioxide is no longer provided and the reaction is terminated.

The high-purity calcium carbonate may be separated using a third filter. The third filter may be the same device as the first filter and the second filter described above and a detailed description thereof will be omitted.

The high-purity calcium carbonate may have a purity of 93.0% or higher, specifically 95.0% or higher, more specifically 98.0-99.9%, a whiteness index of 94.0-99.9 and an average particle size of 5-5,000 nm. Expensive calcium carbonate can be prepared from waste concrete or slag so that economical efficiency is greatly improved as compared to the conventional method.

Referring to FIG. 2, another exemplary embodiment of the present invention may further include a step (S6) of purifying the filtrate of the third filter to a pure mixture of the sodium chloride aqueous solution and the potassium chloride aqueous solution and recycling the same to the electrolysis system of the step (1).

The filtrate may contain various unfiltered cations. The cation may include aluminum (Al), magnesium (Mg), silicon (Si), nickel (Ni), strontium (Sr) and barium (Ba) ions.

No matter how slight the amount of the cations is, the cations are desirably removed to prevent a negative effect on the performance of the ion exchange membrane, electrolytic bath membrane, etc. The cation may be removed by a flocculant. An anionic polymer flocculant is used as the flocculant to cause an agglutination reaction of the cations. Then, the filtrate may be purified to a pure mixture of the sodium chloride aqueous solution and the potassium chloride aqueous solution using a fourth filter.

The mixture of the sodium chloride aqueous solution and the potassium chloride aqueous solution provided to the electrolysis system may contain 5-35 wt % of sodium chloride and potassium chloride, based on the total weight of the mixture.

The content of sodium chloride and potassium chloride may be controlled by evaporating water or further providing sodium chloride.

The overvoltage of the electrolysis system may slightly increases when the concentration of potassium chloride in the mixture of the sodium chloride aqueous solution and the potassium chloride aqueous solution is high. Therefore, the amount of the mixture is advisably slightly reduced and a sodium chloride aqueous solution added to replace the reduced amount, and then the mixture is provided to the electrolysis system.

Since the further added sodium chloride aqueous solution may contain cations such as calcium, magnesium, etc., they may be purified through the steps (S3) and (S4), and then added to the mixture of the sodium chloride aqueous solution and the potassium chloride aqueous solution.

In another exemplary embodiment of the present invention, the step (S1) may be a step wherein hydrochloric acid and a sodium hydroxide aqueous solution or a mixture of the sodium hydroxide aqueous solution and the potassium hydroxide aqueous solution are produced from a sodium chloride aqueous solution or a mixture of the sodium chloride aqueous solution and the potassium chloride aqueous solution recycled from the step (S5) using an electrolysis system.

Specifically, the sodium hydroxide aqueous solution or the mixture of the sodium hydroxide aqueous solution and the potassium hydroxide aqueous solution is produced at the anode of the electrolysis system and the hydrochloric acid is produced at the cathode.

Figure 3:
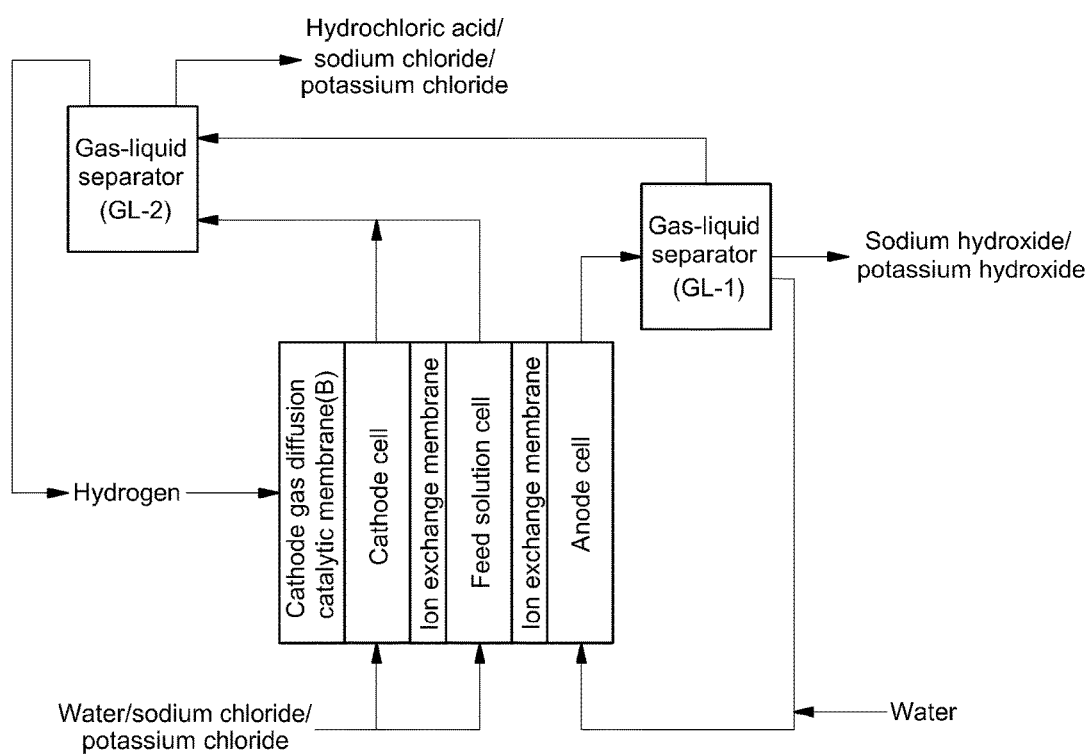
FIG. 3 shows an oxygen cathode-type electrolysis system for preparing an acid and an alkali when hydrogen is available.
Figure 4:
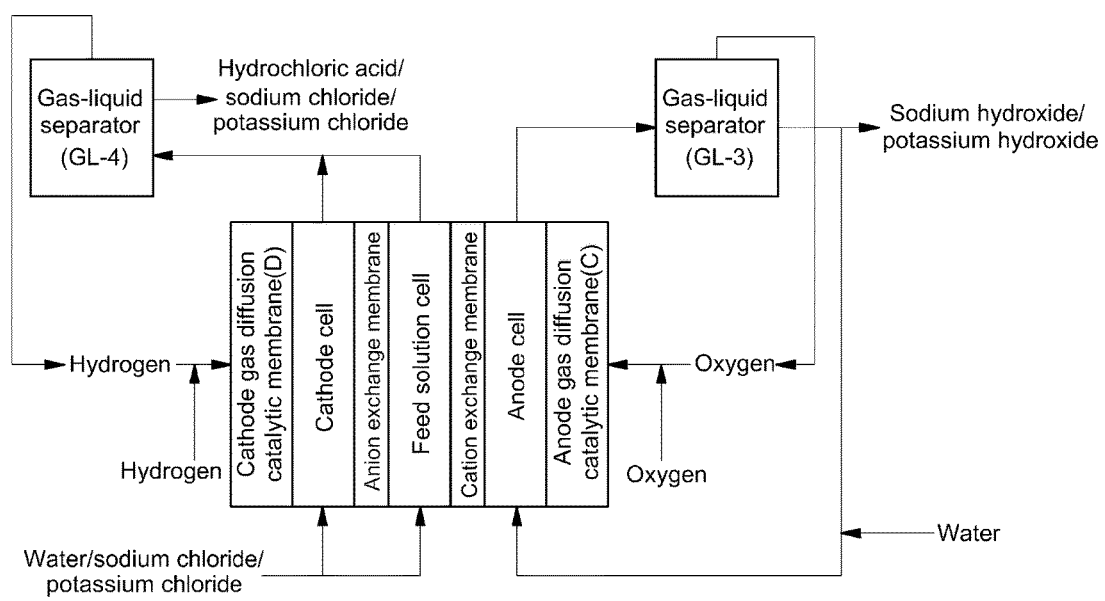
FIG. 4 shows an electrolysis system for preparing an acid and an alkali using electricity.

FIG. 3 and FIG. 4 are schematic views of the electrolysis system. FIG. 3 shows the electrolysis system when inexpensive hydrogen or byproduct hydrogen is unavailable and FIG. 4 shows the electrolysis system when inexpensive hydrogen or byproduct hydrogen is available.

Referring to FIG. 3, the electrolysis system may be composed of a cation exchange membrane, an anion exchange membrane and three cells (cathode cell, anode cell, feed solution cell).

The feed solution cell provides a space to which the sodium chloride aqueous solution or the mixture of the sodium chloride aqueous solution and the potassium chloride aqueous solution recycled in the step (S5) is injected.

The anion exchange membrane is placed between the cathode cell and the feed solution cell and allows selective penetration of chloride anion ($Cl^-$) from the feed solution cell to the cathode cell.

The cation exchange membrane is placed between the anode cell and the feed solution cell and allows selective penetration of sodium cation ($Na^+$) and potassium cation ($K^+$) from the feed solution cell to the anode cell.

The anode cell produces hydroxide ion ($OH^-$) and hydrogen ($H_2$) by electrolyzing water. This reaction can be expressed by the following formula.

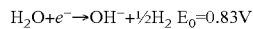

$$H_2O + e^- \rightarrow OH^- + \tfrac{1}{2}H_2 \quad E_0 = 0.83V$$

The hydroxide ion reacts with the sodium cation and the potassium cation that have passed through the cation exchange membrane to produce sodium hydroxide (NaOH) and potassium hydroxide (KOH).

The cathode cell may be a gas diffusion cathode and may include a gas diffusion catalytic membrane. The gas diffusion catalytic membrane oxidizes the hydrogen ($H_2$) provided from the anode cell to hydrogen cation ($H^+$) and then provides the same to the cathode cell. This reaction can be expressed by the following formula.

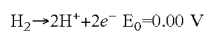

$$H_2 \rightarrow 2H^+ + 2e^- \quad E_0 = 0.00 \text{ V}$$

The hydrogen cation reacts with the chloride anion that has passed through the anion exchange membrane to produce hydrochloric acid.

That is to say, the electrolysis system produces the hydrochloric acid at the cathode and the mixture of the sodium hydroxide aqueous solution and the potassium hydroxide aqueous solution at the anode using the provided sodium chloride aqueous solution or mixture of the sodium chloride aqueous solution and the potassium chloride aqueous solution.

The hydrochloric acid is used to dissolve calcium ion in the step (S2) and the mixture of the sodium hydroxide aqueous solution and the potassium hydroxide aqueous solution is used to precipitate impurities and calcium hydroxide in the step (S3) and the step (S4).

The electrolysis system has a theoretical potential of 0.83 V and consumes about 445 kWh/$t_{CaCO_3}$ of power to produce 1 ton of calcium carbonate in theory. This is very low as compared to the power consumption in acid and alkali production by the chloralkali process. That is to say, in accordance with the present invention, the production cost of high-purity calcium carbonate can be reduced remarkably.

In the present invention, the hydrogen produced at the anode of the electrolysis system is recycled to the cathode. The flow of hydrogen is described in detail referring to FIG. 2.

The hydrogen is produced at the anode cell through electrolysis of water. The hydrogen is separated by a gas-liquid separator GL-1 and provided to a gas-liquid separator GL-2. The hydrogen separated by the gas-liquid separator GL-2 is provided to the gas diffusion catalytic membrane described above and is turned to hydrogen cation.

The electrolysis system of FIG. 3 may be operated under the condition of a temperature of 10-200° C. and a pressure of 1-50 atm, specifically under the condition of a temperature of 20-120° C. and a pressure of 1-5 atm.

The cathode cell may be prepared by supporting or dispersing platinum, iridium, ruthenium, nickel, rhodium, palladium or an alloy thereof on titanium, graphite, carbon paper, carbon nanotube, graphene, etc. and then compressing together with the anion exchange membrane by spraying, brushing, etc. with a hot press under the condition of 1-200 atm and 20-300° C.

The anode cell may be prepared by supporting or dispersing platinum, iridium, ruthenium, palladium, rhodium, gold, silver or an alloy thereof on titanium, graphite, carbon paper, carbon nanotube, graphene, etc. and then compressing together with the cation exchange membrane by spraying, brushing, etc. with a hot press under the condition of 1-200 atm and 20-300° C.

The gas diffusion catalytic membrane may be prepared by supporting or dispersing platinum, iridium, ruthenium, nickel, rhodium, palladium or an alloy thereof on titanium metal mesh, porous titanium membrane or carbon paper as a current collector and then compressing with a hot press under the condition of 1-200 atm and 20-300° C.

The gas diffusion catalytic membrane may also be prepared by, instead of compressing with a hot press, supporting platinum, iridium, ruthenium, nickel, rhodium, palladium or an alloy thereof on the current collector by an electrochemical method.

FIG. 4 shows the electrolysis system for preparing hydrochloric acid and alkali with further decreased power consumption when byproduct hydrogen is available.

The basic configuration and role of the electrolysis system are the same as those described referring to FIG. 3. Hereinafter, only the difference from FIG. 3 is described.

The anode cell of the electrolysis system may include an anode gas diffusion catalytic membrane as a gas diffusion anode. Hydroxide ion produced when oxygen is provided to the anode gas diffusion catalytic membrane. The hydroxide ion reacts with sodium cation and potassium cation at the anode cell to generate the mixture of the sodium hydroxide aqueous solution and the potassium hydroxide aqueous solution.

Unreacted oxygen is separated by a gas-liquid separator GL-3 and provided again to the anode gas diffusion catalytic membrane.

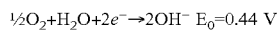

$\frac{1}{2}O_2 + H_2O + 2e^- \rightarrow 2OH^-$   $E_0 = 0.44$ V

Byproduct hydrogen is provided to the cathode gas diffusion catalytic membrane. There, the byproduct hydrogen is oxidized and hydrogen cation is produced. The hydrogen cation reacts with chloride anion at the cathode cell to generate hydrochloric acid.

Unreacted byproduct hydrogen is separated by a gas-liquid separator GL-4 and provided again to the cathode gas diffusion catalytic membrane.

Theoretically, the electrolysis system of FIG. 4 even generates electrical power. Accordingly, when hydrogen is produced as byproduct, it may be advantageous to use the electrolysis system of FIG. 4.

The electrolysis system of FIG. 4 may be operated under the condition of a temperature of 10-250° C. and a pressure of 1-50 atm, specifically under the condition of a temperature of 20-150° C. and a pressure of 1-20 atm.

EXAMPLES

The present invention will be described in more detail through examples. The following examples are for illustrative purposes only and it will be apparent to those skilled in the art that the scope of this invention is not limited by the examples.

Example 1—Analysis of Alkali Ion-Containing Waste Inorganic Material

In this example, steelmaking slag generated as waste in the steelmaking process and waste concrete generated at the construction site were used as waste inorganic materials.

Steelmaking slag was pulverized into powder with a size of 30 μm or smaller.

Waste concrete was pulverized into powder with a size of 75 μm or smaller.

The composition of the steelmaking slag and the waste concrete was investigated by XRF analysis. The result is shown in Table 1.

to calcium carbonate. Also, it can be seen that they contain other metals (Mg, Al, Fe, etc.) which may decrease the purity of calcium carbonate.

X-ray diffraction analysis was conducted to investigate the crystal structure of the two inorganic materials. The result is shown in FIG. 5 and FIG. 6.

Figure 5:
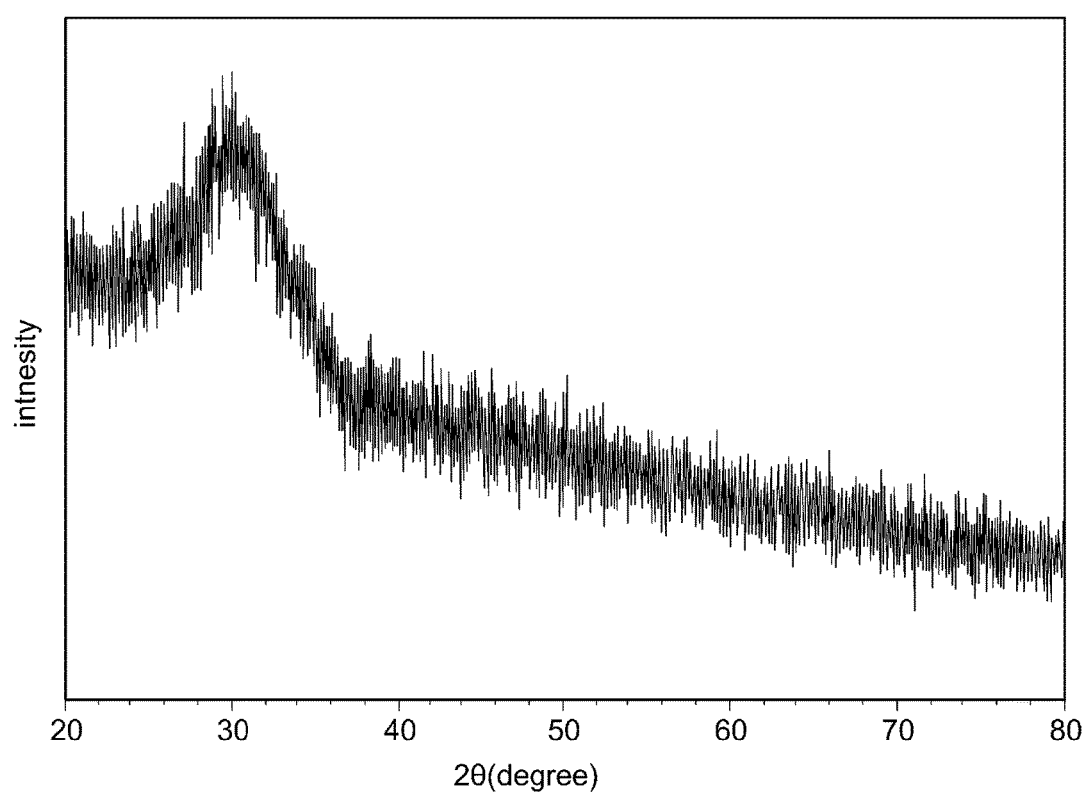
FIG. 5 shows an X-ray diffraction analysis result of steelmaking slag.

Referring to FIG. 5, it can be seen that the steelmaking slag is amorphous. The strong peaks observed at 30° are attributed to CaO (PDF #2850775) and $SiO_2$ (PDF #882483).

Figure 6:
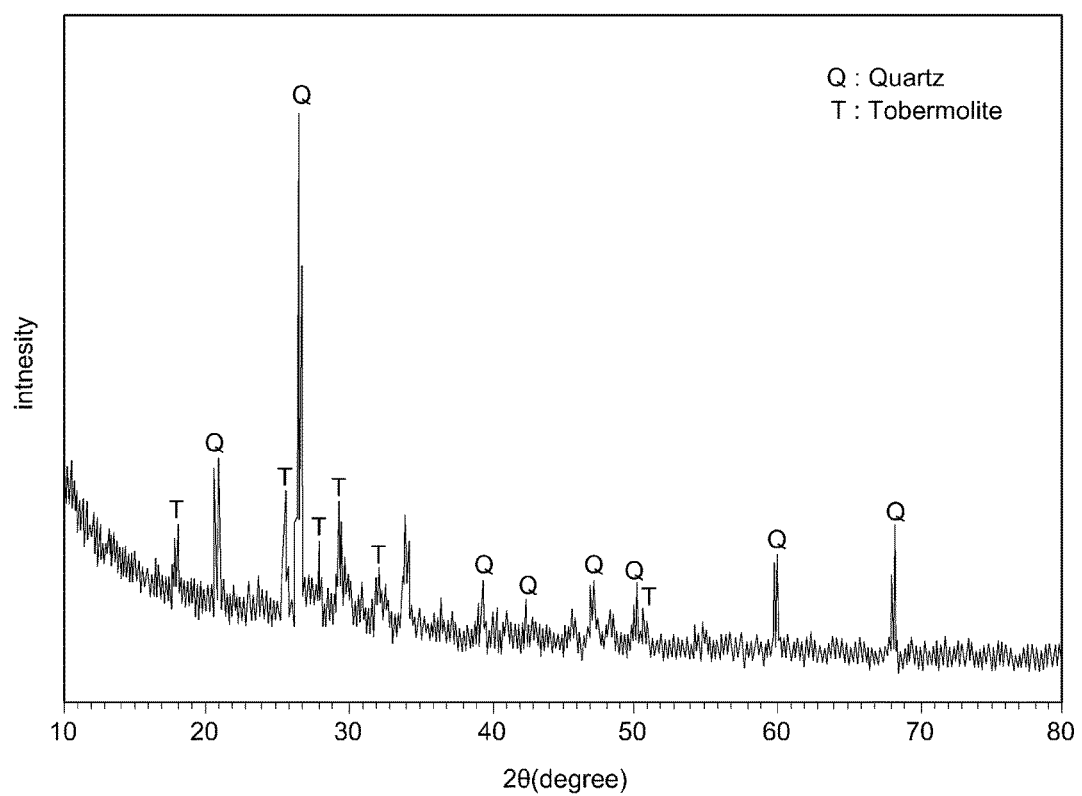
FIG. 6 shows an X-ray diffraction analysis result of waste concrete.

Referring to FIG. 6, two crystal phases were observed for the waste concrete. They were confirmed to be quartz, the main component of sand, and terbomorite, the main component of concrete.

Example 2—Preparation of Dissolving Solution (Step (S2)) and Establishment of Solid-to-Liquid Ratio for Maximizing Hydrochloric Acid Consumption Yield The steelmaking slag and waste concrete of Example 1 were used.

The steelmaking slag and the waste concrete were reacted with hydrochloric acid produced by an electrolysis system in an extraction reactor. The concentration of the hydrochloric acid was 0.5 M and the reaction temperature of the extraction reactor was 30° C.

The solid-to-liquid ratio of the steelmaking slag and the waste concrete to the hydrochloric acid was set to 20, 30, 40, 50, 60 and 70 g/L.

After stirring for 30 minutes in the extraction reactor, a dissolving solution and unreacted solid were separated using a 0.2-μm membrane filter.

Figure 7:
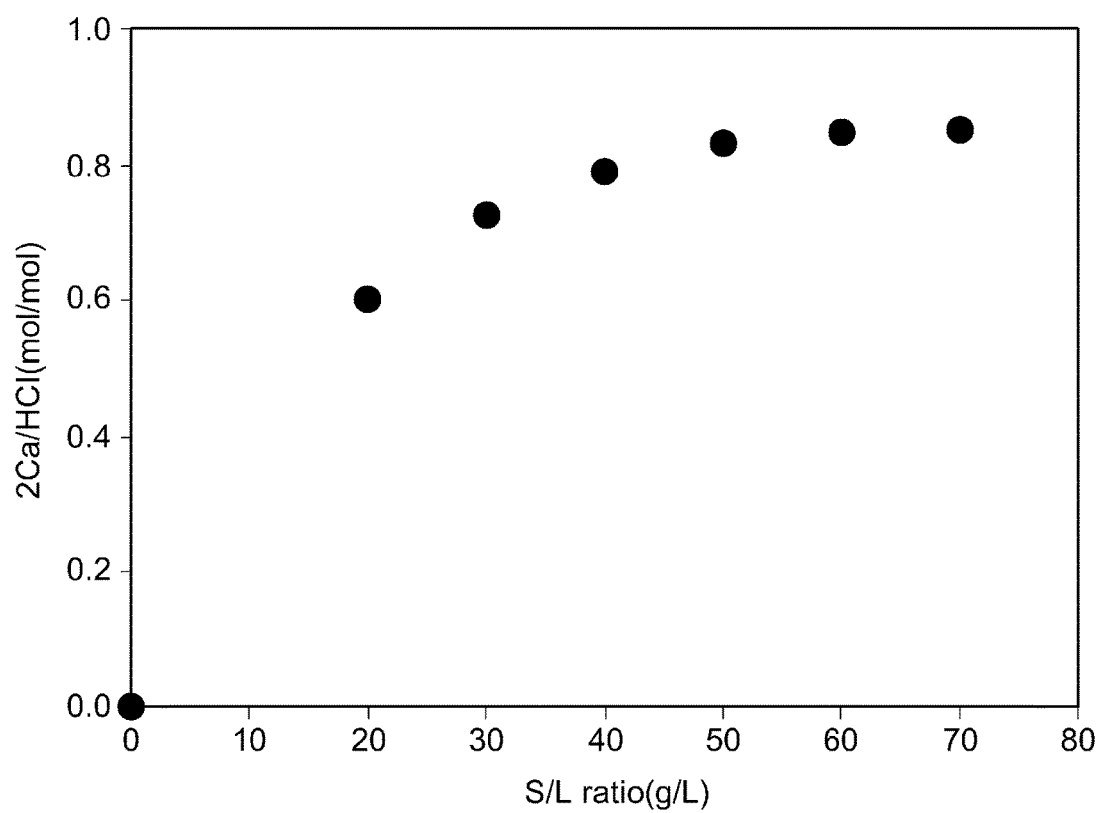
FIG. 7 shows the dissolution rate of calcium ion depending on the solid-to-liquid ratio of steelmaking slag and hydrochloric acid.
Figure 8:
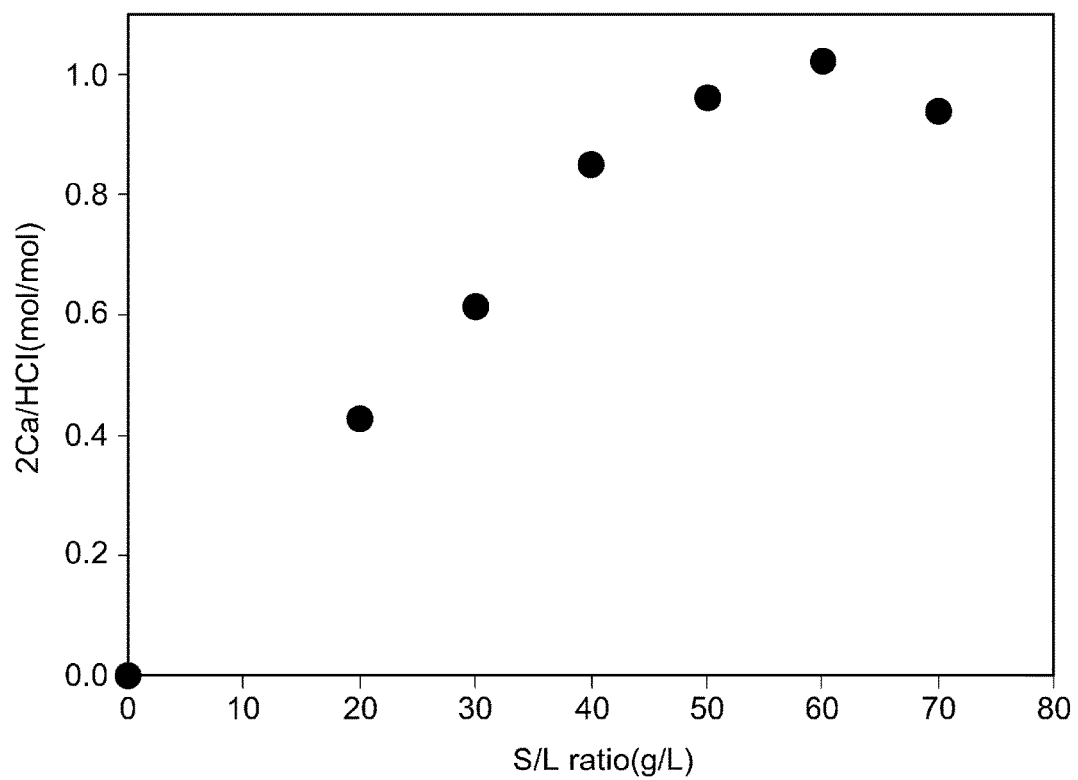
FIG. 8 shows the dissolution rate of calcium ion depending on the solid-to-liquid ratio of waste concrete and hydrochloric acid.

The dissolution rate of calcium ion from the steelmaking slag and the waste concrete is shown in FIG. 7 and FIG. 8, respectively.

Referring to FIG. 7, for the steelmaking slag, the dissolution rate increases with the solid-to-liquid ratio. But, when the solid-to-liquid ratio is 50 g/L or greater, the dissolution rate is saturated almost at 0.8 even when the quantity of the steelmaking slag added is increased.

Referring to FIG. 8, the waste concrete shows linear increase of the dissolution rate as the solid-to-liquid ratio increases. The dissolution rate is 0.98 when the solid-to-liquid ratio is 50 g/L and the maximum calcium dissolution rate of 1.0 is achieved when the solid-to-liquid ratio is 60 g/L.

From the figures, it can be seen that the maximum hydrochloric acid consumption yield is achieved when the solid-to-liquid ratio of the waste inorganic material and the hydrochloric acid is 40-70 g/L.

The metal ion concentration in the dissolving solution prepared from the steelmaking slag and the waste concrete when the solid-to-liquid ratio is 50 g/L was measured using the inductively coupled plasma optical emission spectrom-

TABLE 1

|  | CaO | $SiO_2$ | $Al_2O_3$ | MgO | $SO_3$ | MnO | $K_2O$ | FeO | $TiO_2$ | Others |
|---|---|---|---|---|---|---|---|---|---|---|
| Steelmaking slag | 50.1 | 38.9 | 5.7 | 1.9 | 1.7 | 0.6 | 0.5 | 0.3 | 0.2 | 0.1 |
| Waste concrete | 50.7 | 28.4 | 6.2 | 1.3 | 1.1 | 0.2 | 3.7 | 6.0 | 0.6 | 1.8 |

From Table 1, it can be seen that the two inorganic materials contain 50% or more CaO which can be converted eter (ICP-OES). The result is shown in Table 2. In Table 2, the concentration of each ion is given in mg/L unit.

TABLE 2

|    | Steelmaking slag [mg/L] | Waste concrete [mg/L] |
|----|-------------------------|-----------------------|
| Ca | 8532.086                | 10221.7               |
| Mg | 639.656                 | 300.882               |
| Fe | 56.666                  | —                     |
| Al | 354.42                  | 25.999                |
| K  | 55.878                  | 75.34                 |

From Table 2, it can be seen that the two dissolving solutions contain calcium ion in largest contents. This means that the steelmaking slag and the waste concrete are suitable for preparation of calcium carbonate.

Also, it can be seen that metals other than calcium (magnesium, iron, aluminum) need to be removed before carbonation because they can be precipitated as carbonate or hydroxide.

Example 3—Removal of Impurity from Dissolving Solution (Step (S3))

The dissolving solution prepared in Example 2 (solid-to-liquid ratio=50 g/L) was used.

A 1 M sodium hydroxide aqueous solution produced by an electrolysis system was added to 100 mL of the dissolving solution. Precipitation occurred as the pH of the dissolving solution was changed. Samples were taken for each pH using a 1-mL syringe. The samples were subjected to solid-liquid separation using a 0.2 syringe filter. Then, the metal ion concentration in the samples was measured by ICP-OES.

Figure 9A:
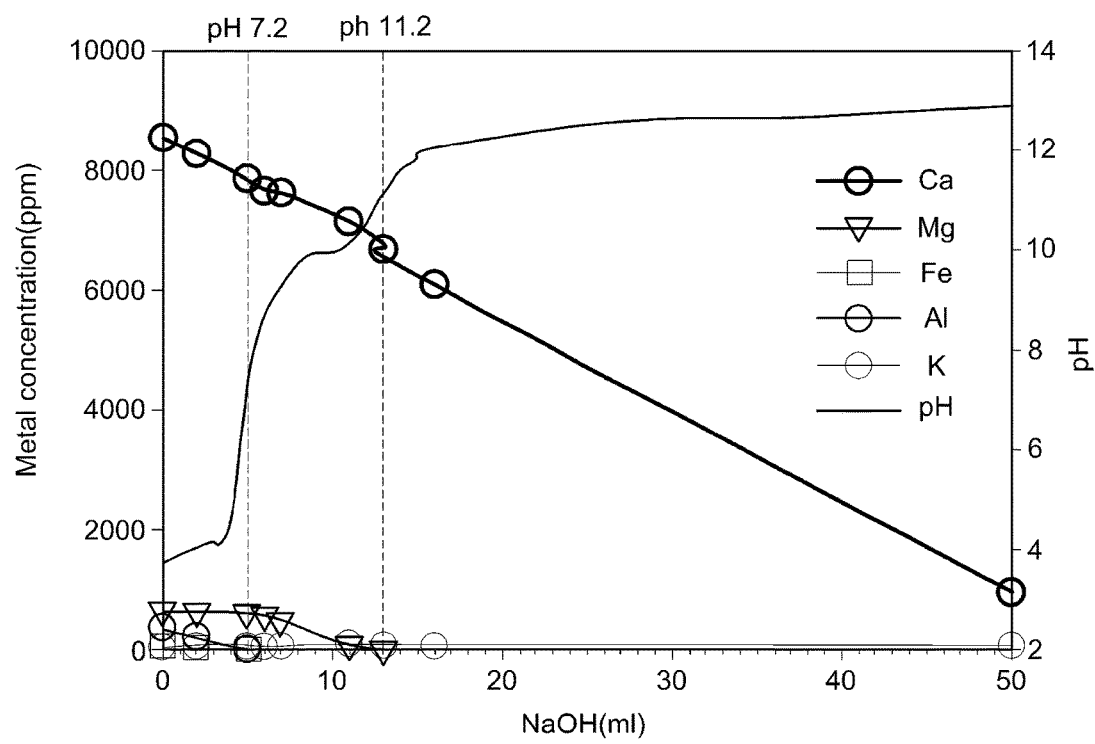
FIG. 9($a$) shows the change in the metal ion concentration and pH in a dissolving solution prepared from steelmaking slag (solid-to-liquid ratio=50 g/L) when a sodium hydroxide aqueous solution is added to the dissolving solution. Specifically, X-axis represents the amount of the added sodium hydroxide aqueous solution and Y-axis represents the change in the metal ion concentration and pH.
Figure 9:
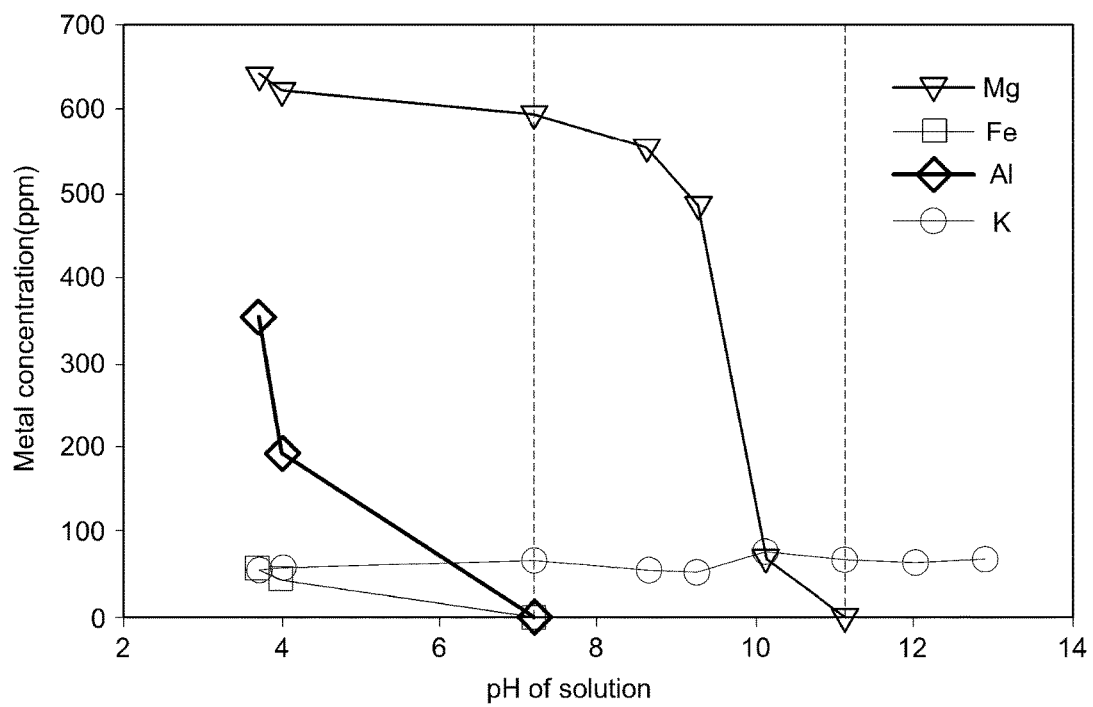

The change in the pH and metal ion concentration of the dissolving solution depending on the addition of the sodium hydroxide aqueous solution is shown in FIGS. 9 (a) and (b), and FIGS. 10(a) and (b).

Referring to FIG. 9 (a), the dissolving solution prepared from the steelmaking slag was acidic with an initial pH of 3.71. As the sodium hydroxide aqueous solution was, ocherous precipitate was formed.

Referring to FIG. 9 (b), the concentration of iron and aluminum ions decreased rapidly as the pH was increased. At pH 7.2, the iron and aluminum ions were not detected in the ICP-OES analysis. The concentration of magnesium ion decreased rapidly with pH and no magnesium ion was detected at pH 11.2.

Figure 10:
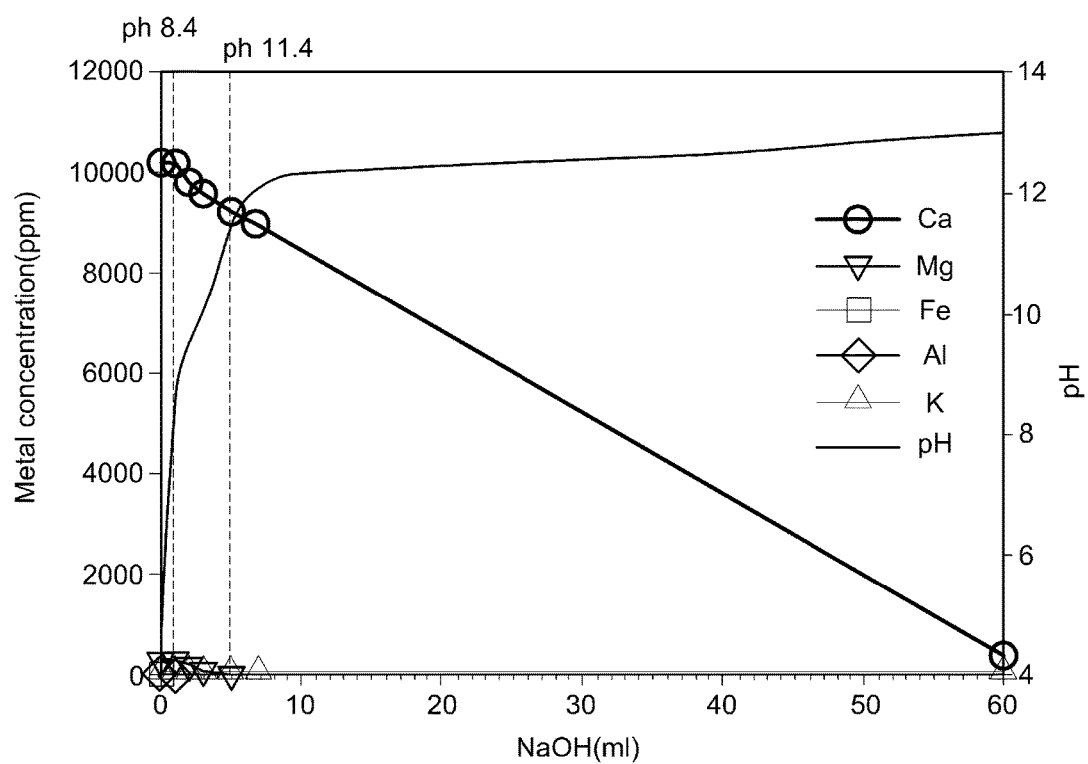
FIG. 10($a$) shows the change in the metal ion concentration and pH in a dissolving solution prepared from waste concrete (solid-to-liquid ratio=50 g/L) when a sodium hydroxide aqueous solution is added to the dissolving solution. Specifically, X-axis represents the amount of the added sodium hydroxide aqueous solution and Y-axis represents the change in the metal ion concentration and pH.
Figure 10:
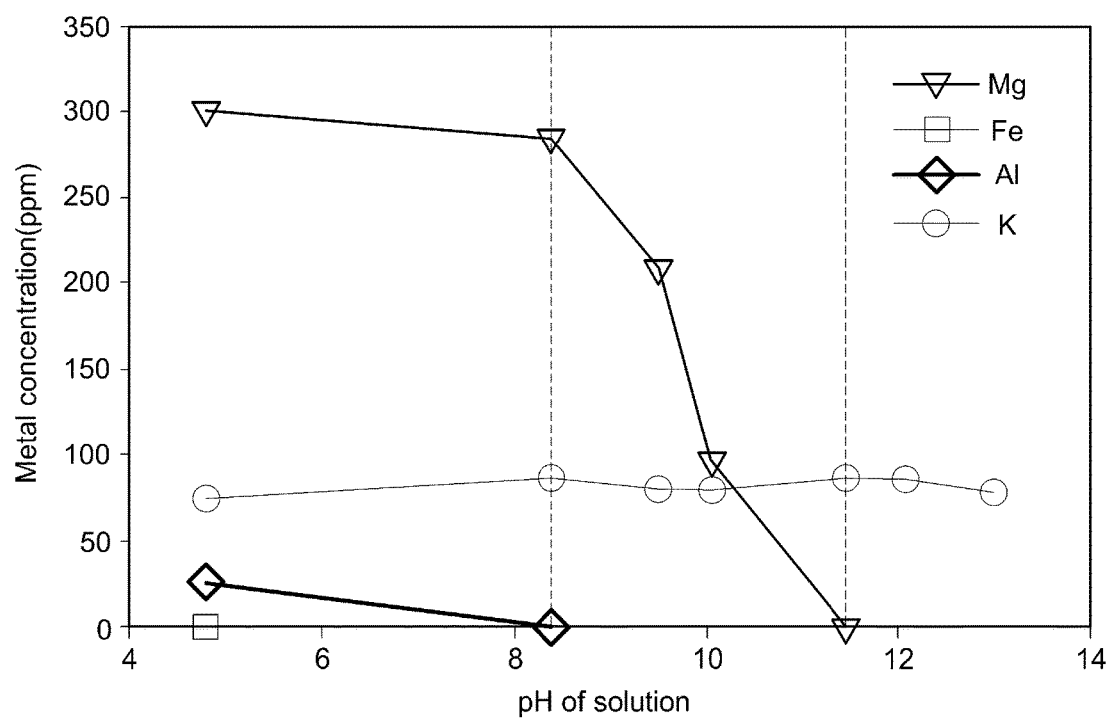

Referring to FIG. 10 (a), the initial pH of the dissolving solution prepared from the waste concrete was slightly higher than that of the dissolving solution prepared from the steelmaking slag at pH 4.79. As the sodium hydroxide aqueous solution, precipitate was formed.

Referring to FIG. 10 (b), the concentration of aluminum ion decreased with pH and no aluminum ion was detected at pH 8.4. The concentration of magnesium ion decreased rapidly at higher pH and no magnesium ion was detected at pH 11.4.

That is to say, it can be seen that, as the pH of the dissolving solutions prepared from the steelmaking slag and the waste concrete is increased, aluminum ion and iron ion form hydroxide precipitates first and then magnesium ion forms hydroxide precipitate.

Accordingly, the impurities can be removed completely by adding a sodium hydroxide aqueous solution or a mixture of the sodium hydroxide aqueous solution and the potassium hydroxide aqueous solution to the dissolving solution so that the pH of the dissolving solution becomes 7-13.

After the impurities have been removed, calcium ion is decreased because the calcium ion is precipitated as calcium hydroxide.

This tendency can be confirmed from the solubility constants of hydroxides as shown in Table 3. Because calcium hydroxide has the largest solubility constant, hydroxides of other metal ions are precipitated first. Accordingly, high-purity calcium carbonate can be prepared by removing the precipitates.

TABLE 3

|          | $K_{sp}$              |
|----------|-----------------------|
| $Ca(OH)_2$ | $6.5 \times 10^{-6}$  |
| $Mg(OH)_2$ | $1.6 \times 10^{-12}$ |
| $Al(OH)_3$ | $3 \times 10^{-34}$   |
| $Fe(OH)_2$ | $7.9 \times 10^{-16}$ |

Example 4—Preparation of Calcium Hydroxide Slurry (Step (S4)) and Preparation of High-Purity Calcium Carbonate (Step (S5))

The dissolving solution prepared in Example 2 (solid-to-liquid ratio=50 g/L) was used.

Impurities were removed from the dissolving solution by adding a 1 M sodium hydroxide aqueous solution to the dissolving solution so that the pH of the dissolving solution became 8 or 11.

A calcium hydroxide slurry was prepared by mixing the impurity-removed dissolving solution with a 1 M sodium hydroxide aqueous solution at a volume ratio of 2:1.

Carbonation was conducted by injecting carbon dioxide to the slurry at a rate of 300 mL/min. The reaction was terminated when the pH decreased below 7 and remained constant. High-purity calcium carbonate was obtained after filtration.

Sample 1: dissolution of steelmaking slag→removal of impurity by adjusting pH to 8→preparation of calcium hydroxide slurry→preparation of calcium carbonate.

Sample 2: dissolution of steelmaking slag→removal of impurity by adjusting pH to 11→preparation of calcium hydroxide slurry→preparation of calcium carbonate.

Sample 3: dissolution of waste concrete→removal of impurity by adjusting pH to 8→preparation of calcium hydroxide slurry→preparation of calcium carbonate.

Sample 4: dissolution of waste concrete→removal of impurity by adjusting pH to 11→preparation of calcium hydroxide slurry→preparation of calcium carbonate.

The solids obtained from the samples 1-4 were subjected to X-ray diffraction analysis and scanning electron microscopic analysis.

Figure 11:
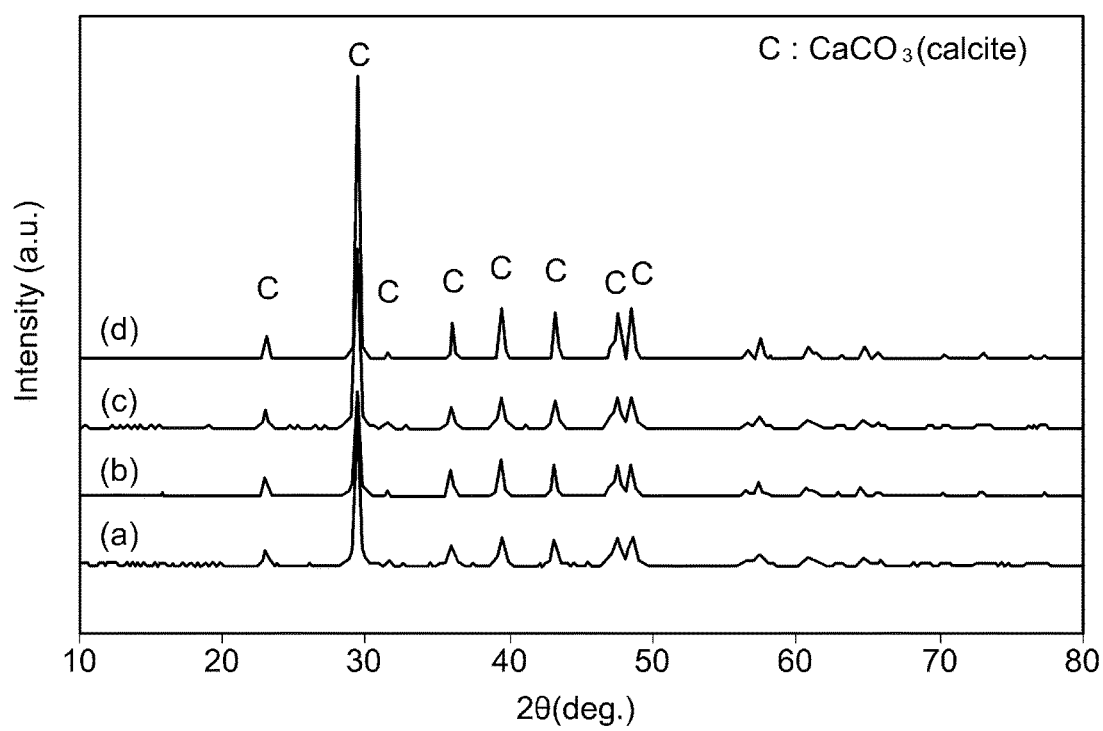
FIG. 11 shows an X-ray diffraction analysis result of calcium carbonate samples 1-4 prepared in Example 4. a, b, c and d respectively denote the samples 1, 2, 3 and 4.

FIG. 11 shows the X-ray diffraction analysis result of the samples 1-4. Referring to the figure, it can be seen that all of them are calcite crystals. Because calcite is the crystal structure of calcium carbonate, it was confirmed that the solids obtained from the samples 1-4 are calcium carbonate.

Figure 12:
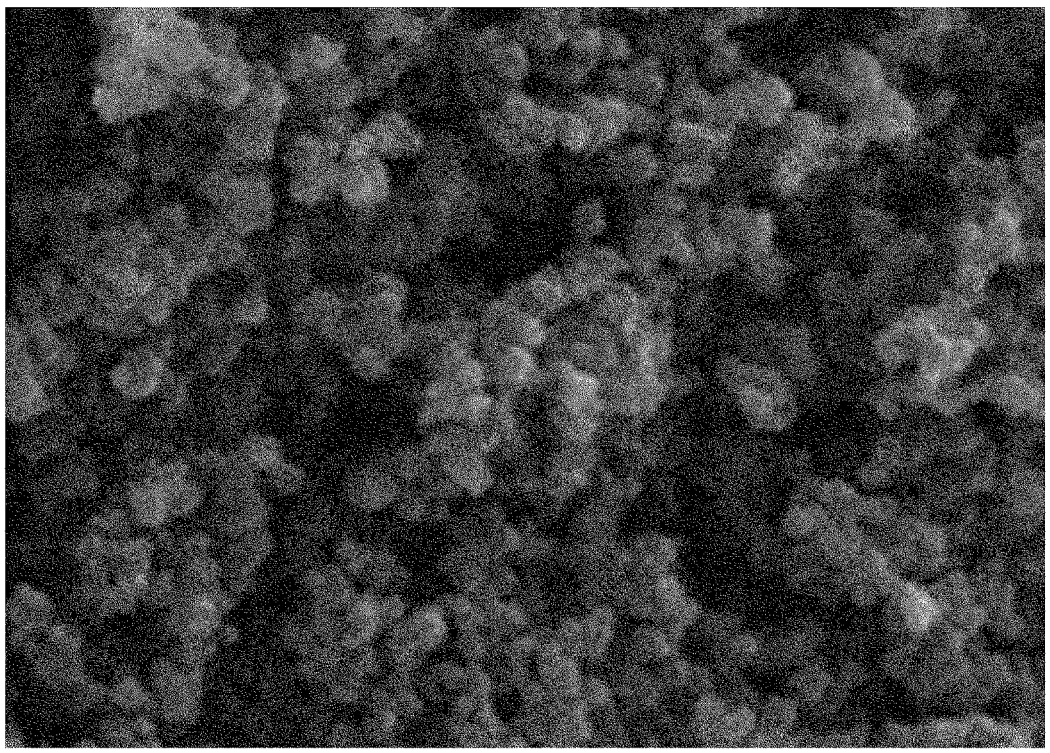
FIG. 12($a$) shows the scanning electron microscopic images of calcium carbonate samples 1 prepared in Example 4.
Figure 12B:
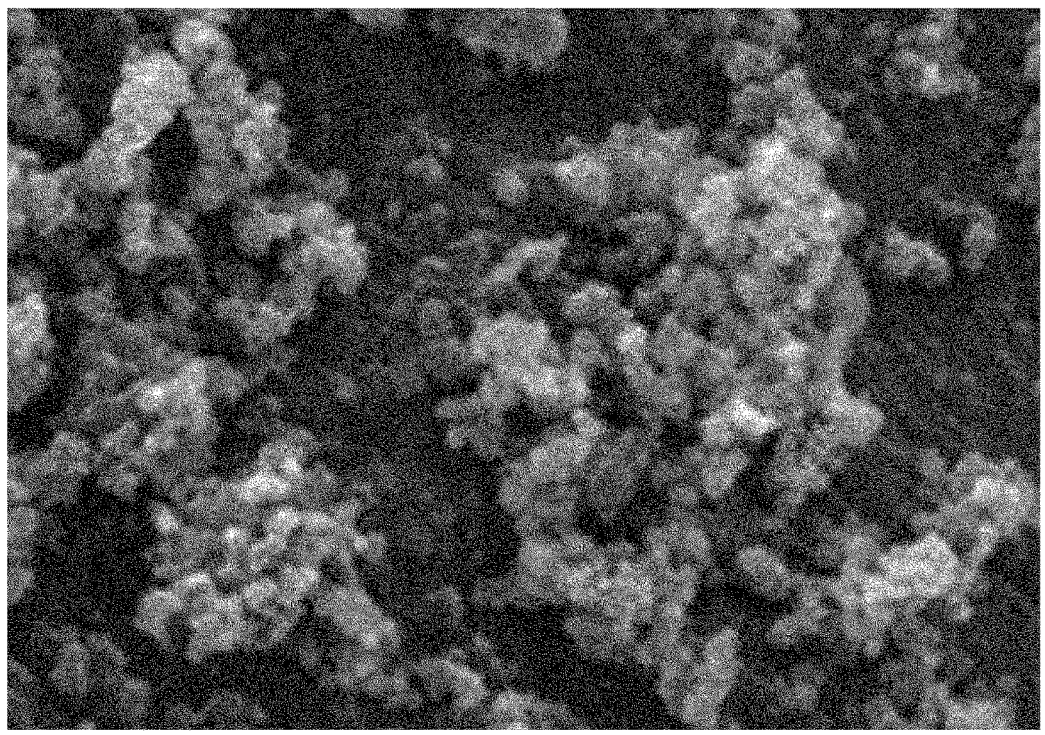
Figure 12:
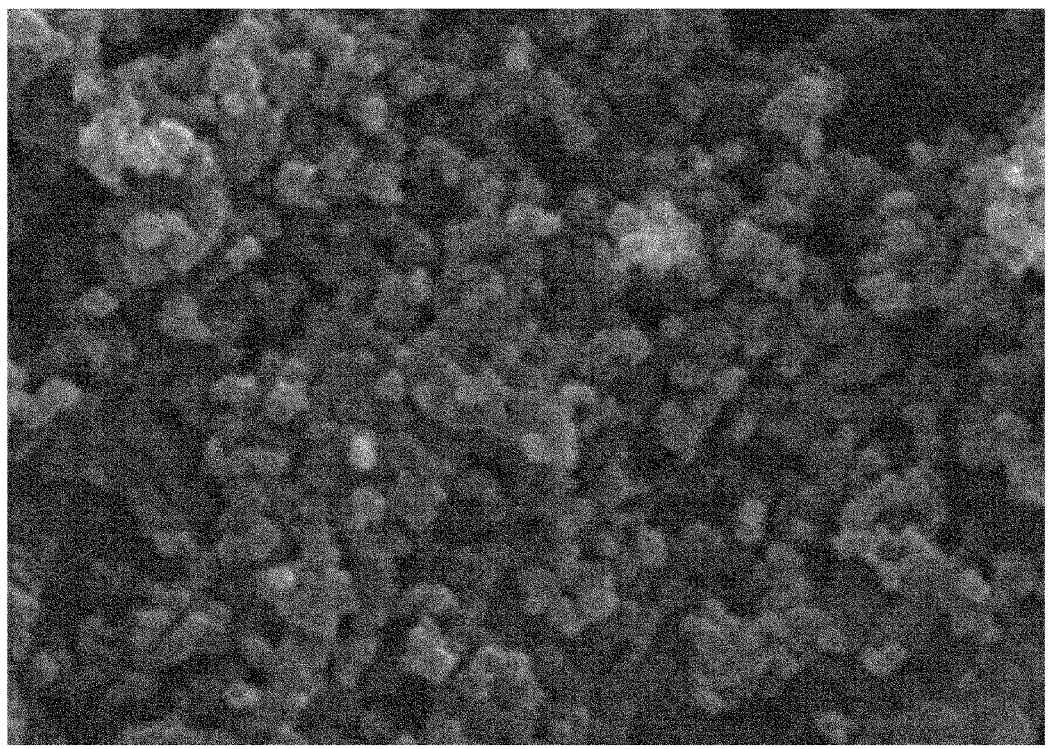
Figure 12D:
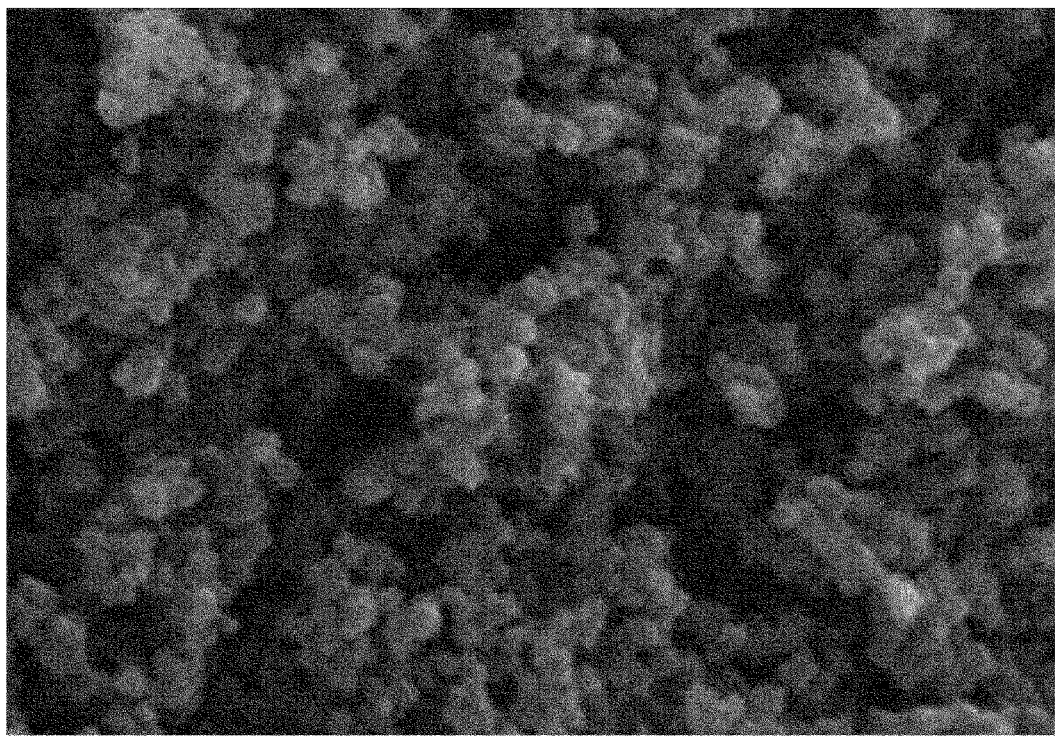

FIGS. 12 (a), (b), (c), and (d) show the scanning electron microscopic analysis result of the samples 1-4, respectively. Referring to the figure, it can be seen that the particles are hexagonal calcium carbonate crystals. Image analysis revealed that the particle size was 100-300 nm.

Accordingly, it was confirmed that nanosized calcium carbonate can be prepared in accordance with the present invention.

Example 5—Analysis of Purity of Calcium Carbonate

The solids prepared in Example 4 were subjected to elemental analysis by X-ray fluorescence. Also, the purity of the solids was analyzed based on the loss on ignition. The result is shown in Table 4. In the table, the solid metal components are represented as oxides.

TABLE 4

|  | Sample 1 [wt %] | Sample 2 [wt %] | Sample 3 [wt %] | Sample 4 [wt %] |
| --- | --- | --- | --- | --- |
| $Na_2O$ | 0.21 | 0.24 | 0.16 | 0.1 |
| MgO | 0.33 | 0.12 | 0.22 | — |
| $Al_2O_3$ | <0.01 | — | — | — |
| $SiO_2$ | 0.15 | 0.02 | 0.09 | 0.03 |
| $K_2O$ | — | <0.01 | <0.01 | — |
| CaO | 55.24 | 55.87 | 55.45 | 55.86 |
| MnO | 0.17 | <0.01 | 0.02 | — |
| NiO | <0.01 | <0.01 | 0.01 | <0.01 |
| SrO | 0.08 | 0.09 | 0.07 | 0.05 |
| BaO | 0.08 | 0.11 | — | — |
| Loss on ignition | 43.73 | 43.54 | 43.99 | 43.96 |

From Table 4, it can be seen that the sample 2 and the sample 4 whose impurities were removed from the dissolving solution by adjusting pH to 11 have low impurity contents and high calcium carbonate contents as compared to the sample 1 and the sample 3 whose impurities were removed by adjusting pH to 8.

For the steelmaking slag, the sample 2 shows 0.2 wt % lower MgO content and 0.5 wt % higher CaO content as compared to the sample 1.

For the waste concrete, MgO and other impurities ($Na_2O$, $SiO_2$, MnO, NiO, SrO, BaO) were not detected at all for the sample 4 or were detected at much lower contents as compared to the sample 3. But, the content of CaO was higher.

It can also be seen that the contents of the impurities are very low as compared to that of the calcium carbonate. Accordingly, it was confirmed that high-purity calcium carbonate with a purity of 98-99.9% can be obtained from industrial wastes such as steelmaking slag or waste concrete in accordance with the present invention.

Example 6—Preparation of High-Purity Calcium Carbonate while Varying Carbon Dioxide Injection Rate During Carbonization High-purity calcium carbonate was prepared from steelmaking slag through a semi-batch process as shown in FIG. 1 and FIG. 2.

A 10-L double jacket glass reactor was used as an extraction reactor. A dissolving solution was prepared by adding 400 g of steelmaking slag and 8 L of 0.5 M hydrochloric acid to the extraction reactor. Accordingly, the solid-to-liquid ratio was 50 g/L. Specifically, a steelmaking slag slurry was prepared by mixing 400 g of steelmaking slag with 2 L of 0.5 M hydrochloric acid and then 6 L of 0.5 M hydrochloric acid (from a hydrochloric acid reservoir) and the steelmaking slag slurry were added to the 10-L extraction reactor using respective pumps. The mixture was stirred in the extraction reactor at 500 RPM using a mechanical stirrer. During the reaction, the reaction temperature was maintained at 30° C. using a circulatory constant temperature bath. The reaction was conducted for 30 minutes. After the reaction was completed, unreacted reactant and the dissolving solution were separated using filter paper (grade 3, Whatman).

A purification reactor was prepared in the same manner as the extraction reactor. The dissolving solution was provided to the purification reactor using a pump. Then, the pH of the solution was increased to 11 by adding a 1 M sodium hydroxide aqueous solution. The precipitation of impurities was observed. The precipitate was removed using filter paper (grade 3, Whatman) to obtain an impurity-removed dissolving solution.

10 L of the impurity-removed dissolving solution was provided to a slurry generator. Then, a calcium hydroxide slurry was prepared by adding a 1 M sodium hydroxide aqueous solution until the pH reached 12.6.

The slurry was transferred to a carbonation reactor and carbon dioxide was injected while stirring at 500 RPM using a mechanical stirrer. The carbon dioxide was injected at a ratio of 500 mL/min, 1000 mL/min or 1500 mL/min. During the carbonization, the reaction temperature was maintained at 30° C. using a circulatory constant temperature bath. The carbon dioxide injection was stopped when the pH in the reactor reached 7. After the reaction was completed, the produced calcium carbonate and the filtrate were separated using a membrane filter (nylon, 0.45 μm, Whatman). The calcium carbonate was dried at 105° C. for 6 hours.

Scanning electron microscopic analysis, particle size analysis, X-ray fluorescence analysis and X-ray diffraction analysis were conducted for characterization of the calcium carbonate.

Figure 13:
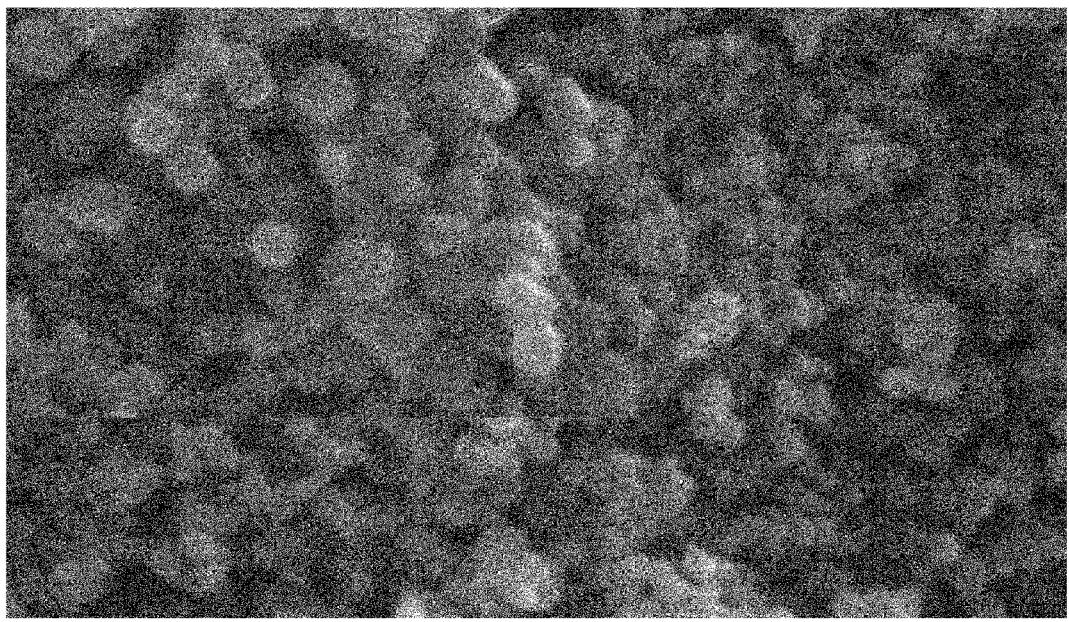
FIG. 13($a$) shows the scanning electron microscopic images of calcium carbonate prepared by injecting carbon dioxide at a flow rate of 500 mL/min in Example 6. The large images are at 30000× magnification and the small images are at 100000× magnification.
Figure 13:
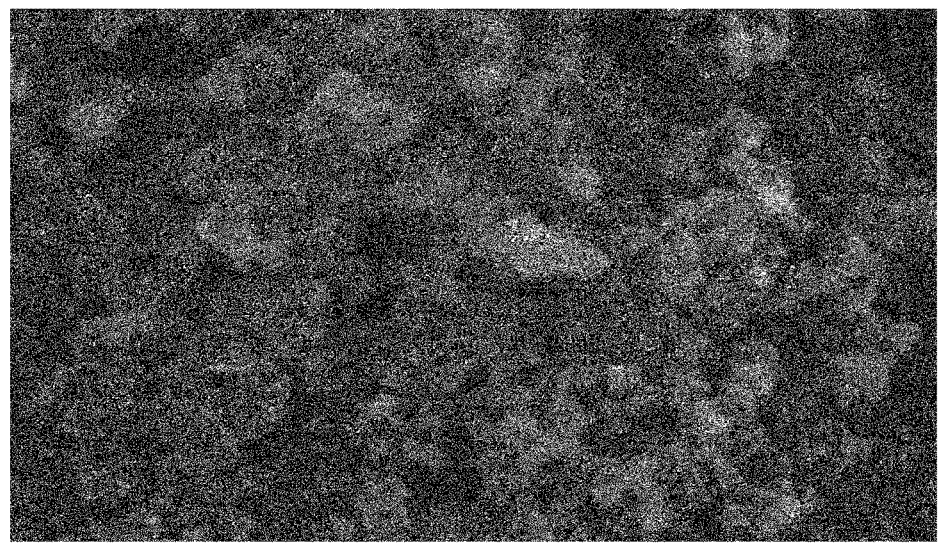
Figure 13:

FIGS. 13 (a), (b), and (c) show the result of scanning electron microscopic analysis. It can be seen that the particles are hexagonal calcium carbonate crystals.

Figure 14:
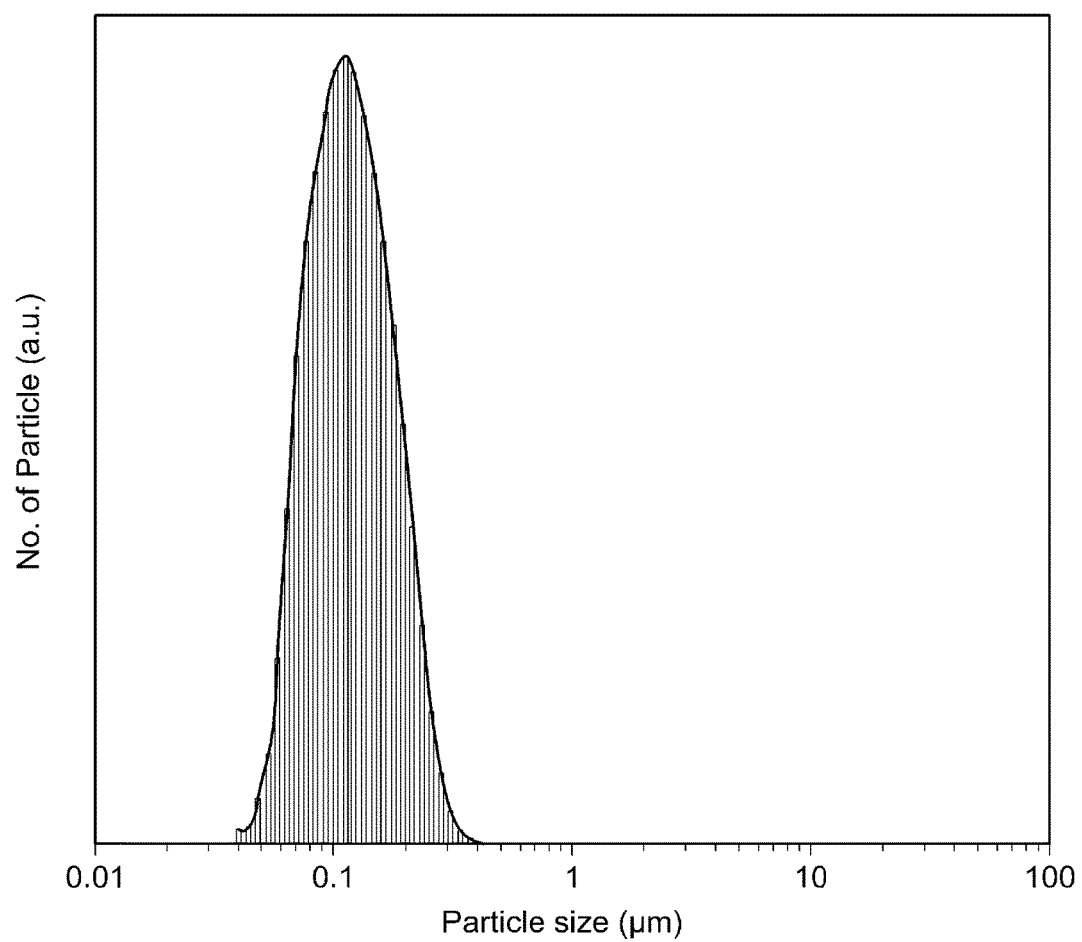
FIG. 14($a$) shows a particle size analysis result of calcium carbonate prepared by injecting carbon dioxide at a flow rate of 500 mL/min in Example 6.
Figure 14:
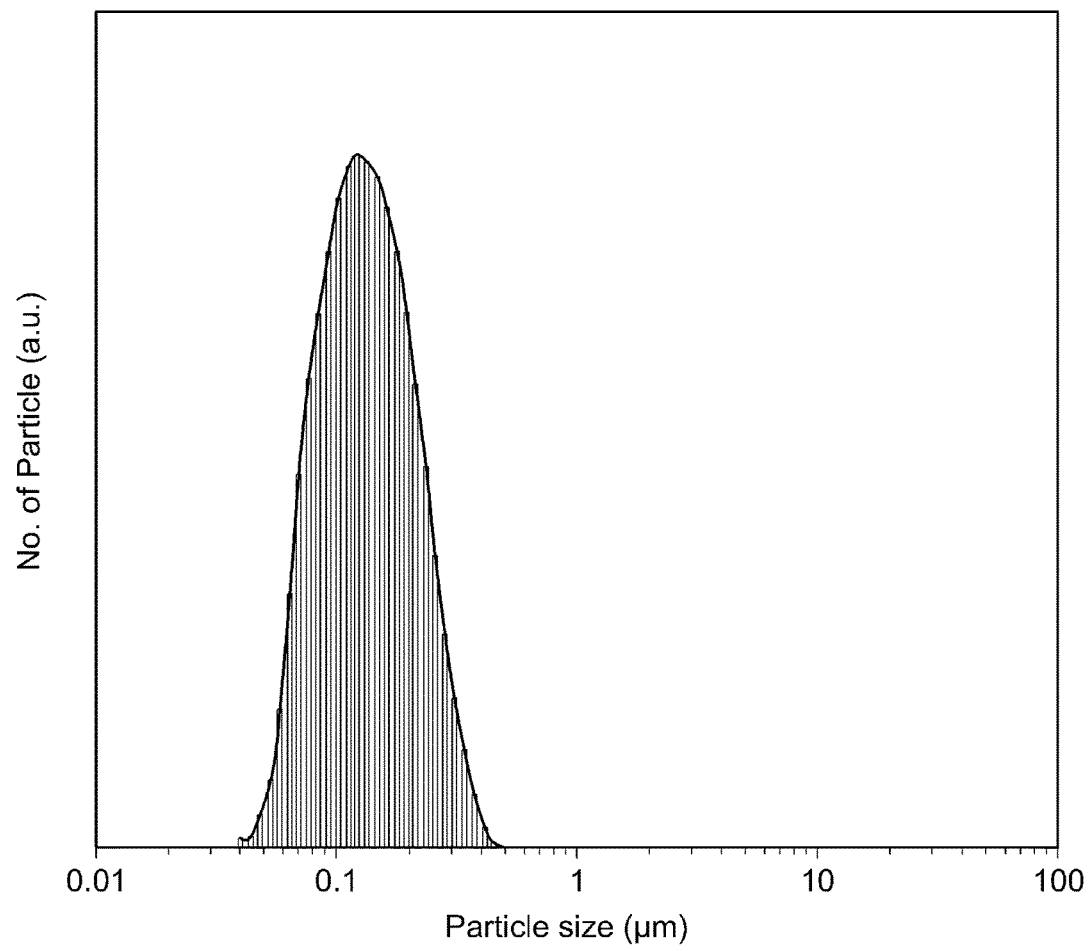
Figure 14:
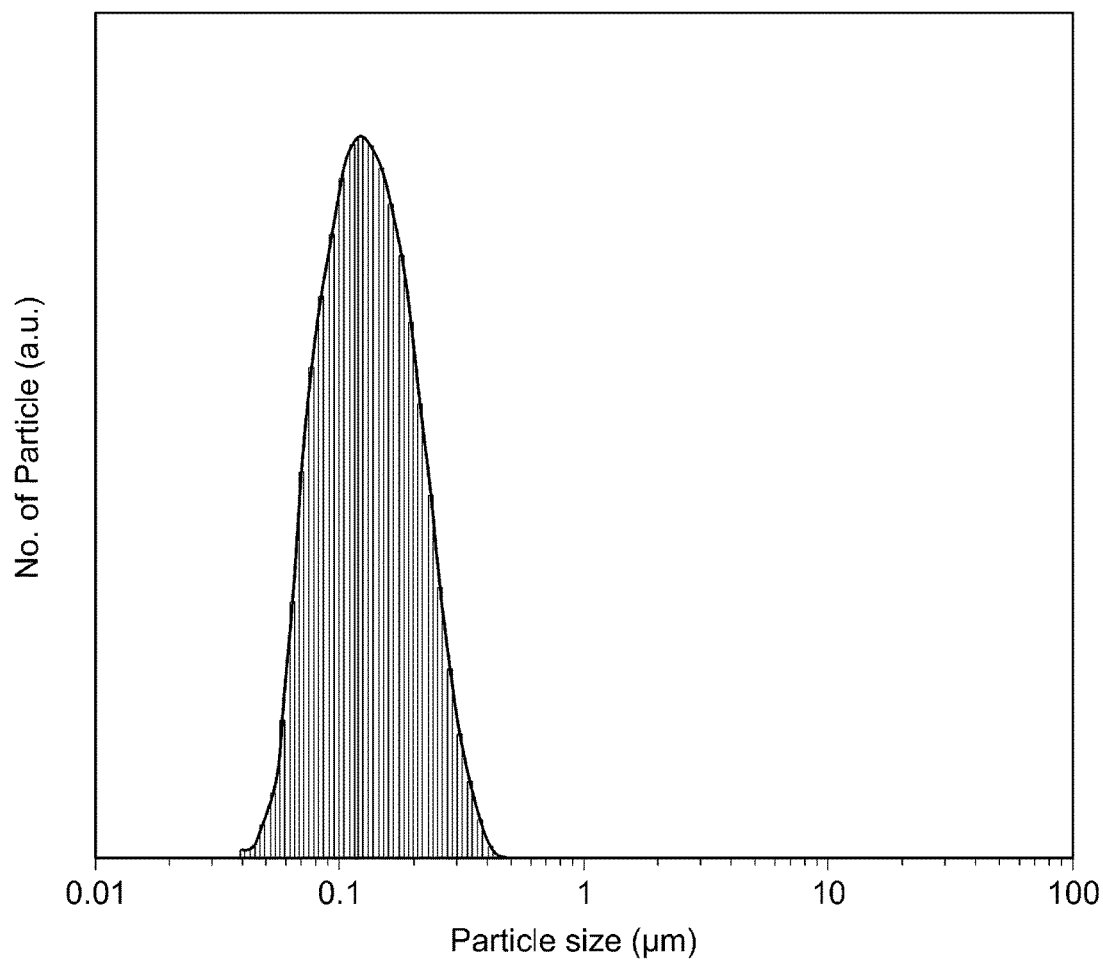

FIGS. 14 (a), (b), and (c) show the result of particle size analysis. It can be seen that calcium carbonate has an average particle size of about 80 nm.

Figure 15:
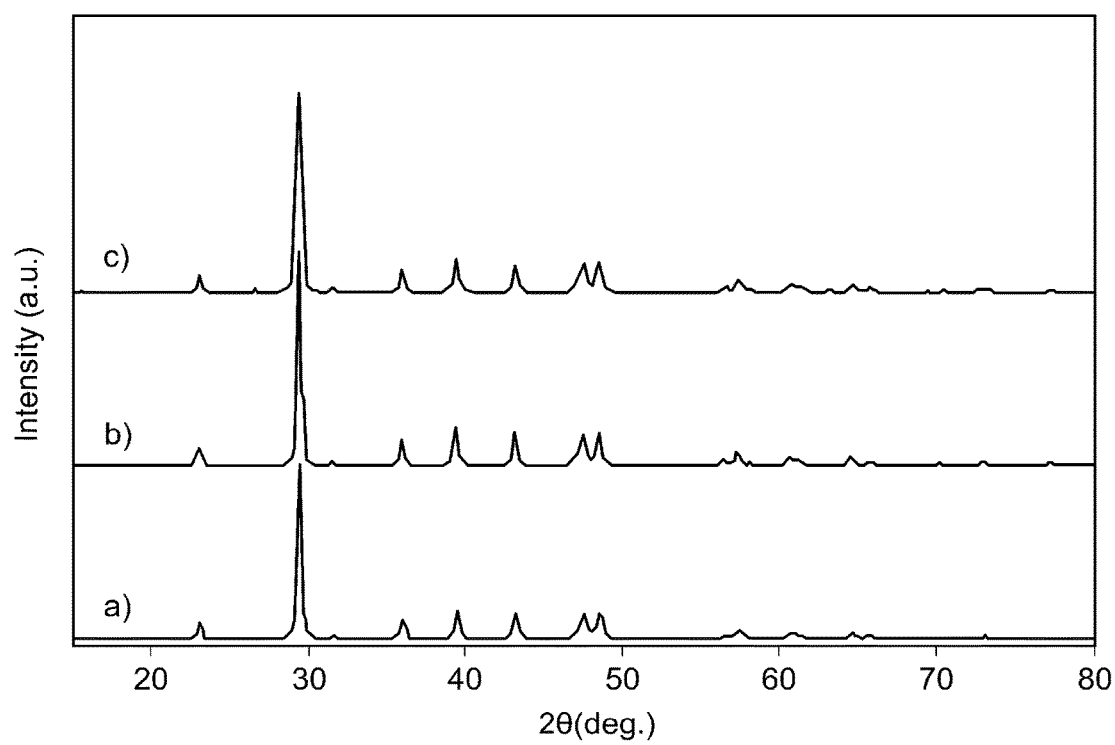
FIG. 15 shows an X-ray diffraction analysis result of calcium carbonate prepared in Example 6. a, b and c respectively denote the calcium carbonate prepared by injecting carbon dioxide at a flow rate of 500, 1000 and 1500 mL/min.

FIG. 15 shows the result of X-ray diffraction analysis. It can be seen that the particles are calcite crystals.

Table 5 shows the result of X-ray fluorescence analysis.

TABLE 5

|  | 500 mL/min [wt %] | 1000 mL/min [wt %] | 1500 mL/min [wt %] |
| --- | --- | --- | --- |
| $Na_2O$ | 0.643 | 0.601 | 0.616 |
| MgO | 0.0376 | — | 0.0173 |
| $Al_2O_3$ | 0.0119 | 0.0035 | 0.0023 |
| $SiO_2$ | 0.0274 | 0.0401 | 0.0425 |
| $K_2O$ | 0.033 | 0.042 | 0.055 |
| CaO | 98.7 | 98.6 | 98.6 |
| Cl | 0.405 | 0.527 | 0.793 |
| CuO | — | trace | — |
| SrO | 0.0893 | 0.0342 | 0.0388 |
| BaO | 0.108 | 0.0744 | 0.0419 |
| Hunter whiteness index | 98.1 | 97.5 | 97.6 |

From Table 5, it can be seen that the calcium carbonate has a purity of 98.5% or higher and a whiteness index of 97 or higher.

Example 7

1) Preparation of Continuous Flow Unit Cell for Electrolysis System of FIG. 3

A cell used for electrolysis of brine consisted of two ion exchange membranes and three separators. The separator was prepared from titanium and graphite and channels were equipped for effective flow of reactants. The cells consisted of a cathode, a feed solution cell for brine and an anode. An anion exchange membrane (Neosepta ACS, AHA, Astom Co.) was placed between the cathode and the feed solution cell and a cation exchange membrane (Nafion 115, DuPont) was placed between the anode and the feed solution cell.

The cathode and the anode were prepared to a size of 3.3 cm×3.3 cm. As a gas diffusion catalytic membrane which supports the electrodes and the ion exchange membranes and transfers the reactants, titanium mat (MFTL-07, FiberTech, Korea) and polypropylene mesh were used. The cell was assembled under a constant torque of 50.

2) Preparation of Electrodes for Electrolysis System of FIG. 3

The electrode was prepared by supporting platinum black (Johnson Matthey), a platinum catalyst (Johnson Matthey) or a carbon-supported platinum catalyst on a polymer electrolyte membrane or carbon paper.

A catalyst ink was prepared from a mixture solvent of distilled water and isopropyl alcohol and the electrode was prepared by spraying or blading the catalyst ink on a polymer electrolyte membrane or carbon paper.

The catalyst ink was prepared by dispersing a 5 wt % Nafion ionomer and a catalyst in a mixture solvent of distilled water and isopropyl alcohol through sonication.

3) Evaluation of Performance and Characteristics of Unit Cell of FIG. 3

63 mL of humidified hydrogen gas was flown to the cathode and a 3 M or 5 M sodium chloride aqueous solution was flown to the feed solution cell at a rate of 3 mL/min. For the anode, a 1 M sodium chloride aqueous solution and a 0.1 M sodium hydroxide aqueous solution were used as anode electrolytes.

The cell was operated while recycling brine or the anode electrolytes. The change in pH and current depending on cycle numbers was measured.

The cell performance was measured at room temperature as current obtained under predetermined voltages (1.0 V, 1.25 V, 1.5 V). The result is described in Example 8 and Example 9.

Example 8

Current was measured under predetermined voltages (1.0 V, 1.25 V, 1.5 V) while varying the supporting amount of the platinum catalyst on the cathode of the electrolysis system of Example 7. The result is shown in Table 6.

TABLE 6

| Supporting amount of platinum catalyst [mg/cm$^2$] | Current [mA] | | |
|---|---|---|---|
| | 1.0 V | 1.25 V | 1.5 V |
| 1.0 | 85.1 | 202.5 | 373.0 |
| 0.5 | 91.3 | 192.4 | 315.2 |
| 0.25 | 124.8 | 250.9 | 360.5 |
| 0.15 | 65 | 160 | 290 |

It can be seen that the current does not increase when the supporting amount of the platinum catalyst exceeds 0.25 mg/cm$^2$.

Example 9

Current was measured for the cathode gas diffusion catalytic membranes of the electrolysis system of Example 7 prepared from different materials. The result is shown in Table 7.

TABLE 7

| Material | | Supporting amount of catalyst [mg/cm$^2$] | | Current [mA] | | |
|---|---|---|---|---|---|---|
| Kind | Number | Cathode | Anode | 1.0 V | 1.25 V | 1.5 V |
| Titanium mat | 4 | Platinum, 0.25 | Platinum, 1.0 | 91.3 | 192.4 | 315.2 |
| Polypropylene mesh | 2 | Platinum, 0.25 | Platinum, 1.0 | 94.2 | 210.5 | 405.9 |

It can be seen that the polypropylene mesh is suitable for the cathode gas diffusion catalytic membrane. The polypropylene mesh is also advantageous over other diffusion membrane materials in terms of durability and safety.

Example 10

Long-term cycle test was performed for the electrolysis system of Example 7.

The gas diffusion catalytic membrane was prepared by pressing at 80 atm and 140° C. The inter-electrode distance was 0.2 mm. Polypropylene mesh was used as the gas diffusion catalytic membrane and the supporting amount of the platinum catalyst was 0.25 mg/cm$^2$. The test was conducted at a voltage of 1.5 V.

After 7 days of continuous operation, the electrolysis system operated very stably.

Example 11—Preparation of Electrolysis System of FIG. 4

After preparing the same electrolysis system as in Example 7, an anode gas diffusion catalytic membrane was further added to the anode side. The anode gas diffusion catalytic membrane was prepared to be denser than the cathode gas diffusion catalytic membrane.

Oxygen or air was introduced to the anode gas diffusion catalytic membrane and hydrogen was introduced to cathode gas diffusion catalytic membrane. Unreacted oxygen or unreacted hydrogen was recycled after passing through a gas-liquid separator. The electrolysis system was operated at room temperature.

A sodium hydroxide aqueous solution was prepared at the anode and hydrochloric acid was prepared at the cathode.

Example 12

A platinum catalyst was supported on the anode gas diffusion catalytic membrane and the cathode gas diffusion catalytic membrane.

A 3 M or 5 M sodium chloride aqueous solution was flown to the feed solution cell at a rate of 3 mL/min. A 1 M sodium chloride aqueous solution and a 0.1 M sodium hydroxide aqueous solution were flown to the anode as anode electrolytes.

The cell was operated while recycling brine or the anode electrolytes. The change in pH and current depending on cycle numbers was measured.

Oxygen was provided to the anode at a rate of 50 mL/min and hydrogen was provided to the cathode at a rate of 50 mL/min. The cell was operated at 40° C. while applying a voltage of about 0.5 V.

1.1 M sodium hydroxide was prepared at a gas-liquid separator GL-3 and 0.5 M hydrochloric acid was prepared at a gas-liquid separator GL-4.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A method for preparing calcium carbonate from an alkali ion-comprising inorganic material, which comprises:
   (1) a step of preparing hydrochloric acid solution, and a sodium hydroxide aqueous solution or a mixture of a sodium hydroxide aqueous solution and a potassium hydroxide aqueous solution;
   (2) a step of producing a dissolving solution by extracting metal ions comprising a calcium ion from an alkali ion-comprising inorganic material using the hydrochloric acid solution;
   (3) a step of removing an impurity from the dissolving solution by reacting the dissolving solution with the sodium hydroxide aqueous solution or the mixture of the sodium hydroxide aqueous solution and the potassium hydroxide aqueous solution such that the impurity is transformed into a metal hydroxide and the metal hydroxide is removed;
   (4) a step of producing a slurry comprising calcium hydroxide by reacting an impurity-removed dissolving solution with the sodium hydroxide aqueous solution or the mixture of the sodium hydroxide aqueous solution and the potassium hydroxide aqueous solution; and
   (5) a step of transforming the calcium hydroxide into a high-purity calcium carbonate by providing carbon dioxide to the slurry and separating the high-purity calcium carbonate.

2. The method for preparing calcium carbonate from an alkali ion-comprising inorganic material according to claim 1, wherein, in the step (1), the hydrochloric acid solution, and the sodium hydroxide aqueous solution or the mixture of the sodium hydroxide aqueous solution and the potassium hydroxide aqueous solution are prepared by purifying a waste acid and a waste alkali.

3. The method for preparing calcium carbonate from an alkali ion-comprising inorganic material according to claim 1, wherein in the step (1), the hydrochloric acid solution, and the sodium hydroxide aqueous solution or the mixture of the sodium hydroxide aqueous solution and the potassium hydroxide aqueous solution are prepared by providing a sodium chloride aqueous solution or a mixture of a sodium chloride aqueous solution and a potassium chloride aqueous solution to an electrolysis system.

4. The method for preparing calcium carbonate from an alkali ion-comprising inorganic material according to claim 3, which further comprises a step (6) of recycling the mixture of the sodium chloride aqueous solution and the potassium chloride aqueous solution remaining after the step (5) to the step (1).

5. The method for preparing calcium carbonate from an alkali ion-comprising inorganic material according to claim 1, wherein the inorganic material is one or more selected from a group consisting of waste concrete, slag, fly ash, feldspar ($CaAl_2Si_2O_8$), forsterite ($Mg_2SiO_4$), glauconite, ilmenite ($FeTiO_3$), listwanite (carbonated serpentinite), magnetite, olivine (($Mg,Fe)_2SiO_4$), opoka, serpentine, serpentinite, talc ($Mg_3Si_4Si_{10}(OH)_2$) and wollastonite ($CaSiO_3$).

6. The method for preparing calcium carbonate from an alkali ion-comprising inorganic material according to claim 1, wherein the step (2) is performed under a condition of a hydrochloric acid concentration of 0.1-5.0 M, a solid-to-liquid ratio 10-500 g/L, and a reaction temperature of 10-200° C.

7. The method for preparing calcium carbonate from an alkali ion-comprising inorganic material according to claim 1, wherein, in the step (2), a hydrochloric acid consumption yield based on the alkali ion is 70-100%.

8. The method for preparing calcium carbonate from an alkali ion-comprising inorganic material according to claim 1, wherein a concentration of the sodium hydroxide aqueous solution or the mixture of the sodium hydroxide aqueous solution and the potassium hydroxide aqueous solution added in the step (3) is 0.1-5.0 mol/L.

9. The method for preparing calcium carbonate from an alkali ion-comprising inorganic material according to claim 1, wherein, in the step (3), the impurity is removed by adding the sodium hydroxide aqueous solution or the mixture of the sodium hydroxide aqueous solution and the potassium hydroxide aqueous solution such that a pH of the dissolving solution is in a range from about pH 7 to about pH 13.

10. The method for preparing calcium carbonate from an alkali ion-comprising inorganic material according to claim 9, wherein the impurity is magnesium chloride, iron chloride, aluminum chloride or a combination thereof.

11. The method for preparing calcium carbonate from an alkali ion-comprising inorganic material according to claim 9, wherein, in the step (3), the impurity is precipitated by reacting with the sodium hydroxide aqueous solution or the mixture of the sodium hydroxide aqueous solution and the potassium hydroxide aqueous solution and a precipitated impurity is removed by centrifugation or filtration.

12. The method for preparing calcium carbonate from an alkali ion-comprising inorganic material according to claim 1, wherein a concentration of the sodium hydroxide aqueous solution or the mixture of the sodium hydroxide aqueous solution and the potassium hydroxide aqueous solution added in the step (4) is 0.1-5.0 mol/L.

13. The method for preparing calcium carbonate from an alkali ion-comprising inorganic material according to claim 1, wherein, in the step (4), a volume ratio of the impurity-removed dissolving solution and the sodium hydroxide aqueous solution or the mixture of the sodium hydroxide aqueous solution and the potassium hydroxide aqueous solution is 2:1 to 1:5.

14. The method for preparing calcium carbonate from an alkali ion-comprising inorganic material according to claim 1, wherein the step (5) is performed under a condition of a reaction temperature of 5-150° C. and a pressure of 1-20 atm.

15. The method for preparing calcium carbonate from an alkali ion-comprising inorganic material according to claim 4, wherein, in the step (6), cation remaining in the mixture of the sodium chloride aqueous solution and the potassium chloride aqueous solution after the step (5) is removed by a flocculant and then the mixture of the sodium chloride aqueous solution and the potassium chloride aqueous solution, from which the cation is removed, is recycled to the step (1).

16. The method for preparing calcium carbonate from an alkali ion-comprising inorganic material according to claim 15, wherein the flocculant is an anionic polymer flocculant.

17. The method for preparing calcium carbonate from an alkali ion-comprising inorganic material according to claim 4, wherein, in the step (6), a sodium chloride aqueous solution is additionally provided to the mixture of the sodium chloride aqueous solution and the potassium chloride aqueous solution when the mixture of the sodium chloride aqueous solution and the potassium chloride aqueous solution is recycled to the step (1).

18. The method for preparing calcium carbonate from an alkali ion-comprising inorganic material according to claim 17, wherein the additionally provided sodium chloride aqueous solution is provided to the mixture of the sodium chloride aqueous solution and the potassium chloride aqueous solution after its impurity is removed through the step (3) and the step (4).

19. The method for preparing calcium carbonate from an alkali ion-comprising inorganic material according to claim 3, wherein the electrolysis system of the step (1) produces the sodium hydroxide aqueous solution or the mixture of the sodium hydroxide aqueous solution and the potassium hydroxide aqueous solution at an anode and produces the hydrochloric acid solution at a cathode.

20. The method for preparing calcium carbonate from an alkali ion-comprising inorganic material according to claim 19, wherein the step (1) comprises:
(1-1) a step of providing a sodium chloride aqueous solution or a mixture of the sodium chloride aqueous solution and the potassium chloride aqueous solution to a feed solution cell;
(1-2) a step wherein hydrogen and hydroxide ion are produced at the anode with water electrolyzed, and the hydroxide ion reacts with a sodium ion or a sodium ion/potassium ion that selectively penetrated into the anode from the feed solution cell, such that the sodium hydroxide aqueous solution or the mixture of the sodium hydroxide aqueous solution and the potassium hydroxide aqueous solution are produced;
(1-3) a step of separating the hydrogen from the sodium hydroxide aqueous solution or the mixture of the sodium hydroxide aqueous solution and the potassium hydroxide aqueous solution produced at the anode, storing the sodium hydroxide aqueous solution or the mixture of the sodium hydroxide aqueous solution and the potassium hydroxide aqueous solution for use in the steps (3) and (4), and providing the hydrogen to the cathode;
(1-4) a step wherein the hydrogen is transformed into hydrogen cation at the cathode and the hydrogen cation reacts with a chloride ion that selectively penetrated into the cathode from the feed solution cell such that the hydrochloric acid solution is produced; and
(1-5) a step of separating the hydrochloric acid solution produced at the cathode from unreacted hydrogen, storing the hydrochloric acid solution for use in the step (2), and providing the unreacted hydrogen again to the cathode along with the hydrogen of the step (1-3).

21. The method for preparing calcium carbonate from an alkali ion-comprising inorganic material according to claim 20, wherein the electrolysis system is operated under the condition of a temperature of 10-200° C. and a pressure of 1-50 atm.

22. The method for preparing calcium carbonate from an alkali ion-comprising inorganic material according to claim 19, wherein the step (1) comprises:
(1-1) a step of providing a sodium chloride aqueous solution or a mixture of the sodium chloride aqueous solution and the potassium chloride aqueous solution to a feed solution cell;
(1-2) a step of providing an oxygen to the anode;
(1-3) a step wherein a hydroxide ion is produced from the oxygen reduced at the anode and the hydroxide ion reacts with a sodium ion or a sodium ion/potassium ion that selectively penetrated into the anode from the feed solution cell such that the sodium hydroxide aqueous solution or the mixture of the sodium hydroxide aqueous solution and the potassium hydroxide aqueous solution is produced;
(1-4) a step of separating the sodium hydroxide aqueous solution or the mixture of the sodium hydroxide aqueous solution and the potassium hydroxide aqueous solution produced at the anode from an unreacted oxygen, storing the sodium hydroxide aqueous solution or the mixture of the sodium hydroxide aqueous solution and the potassium hydroxide aqueous solution for use in the steps (3) and (4), and providing the unreacted oxygen again to the anode;
(1-5) a step of providing a hydrogen to the cathode;
(1-6) a step wherein a hydrogen cation is produced from the hydrogen oxidized at the cathode and the hydrogen cation reacts with a chloride ion that selectively penetrated into the cathode from the feed solution cell such that a hydrochloric acid is produced; and
(1-7) a step of separating the hydrochloric acid from an unreacted hydrogen, storing the hydrochloric acid for use in the step (2), and providing the unreacted hydrogen again to the cathode.

23. The method for preparing calcium carbonate from an alkali ion-comprising inorganic material according to claim 22, wherein the electrolysis system is operated under a condition of a temperature of 10-250° C. and a pressure of 1-50 atm.

24. The method for preparing calcium carbonate from an alkali ion-comprising inorganic material according to claim 1, wherein the high-purity calcium carbonate has a purity of 93.0% or higher.

\* \* \* \* \*